(12) United States Patent
Sugitani

(10) Patent No.: US 7,736,256 B2
(45) Date of Patent: Jun. 15, 2010

(54) ELECTRIC POWER STEERING DEVICE FOR VEHICLES APPLYING ASSIST POWER TO ROTARY MEMBER SURROUNDING TIE ROD CONNECTING BAR

(75) Inventor: Nobuyoshi Sugitani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 542 days.

(21) Appl. No.: 11/666,089

(22) PCT Filed: Oct. 21, 2005

(86) PCT No.: PCT/JP2005/019842

§ 371 (c)(1),
(2), (4) Date: Apr. 24, 2007

(87) PCT Pub. No.: WO2006/046675

PCT Pub. Date: May 4, 2006

(65) Prior Publication Data

US 2007/0249453 A1    Oct. 25, 2007

(30) Foreign Application Priority Data

Oct. 25, 2004   (JP) .............................. 2004-309331

(51) Int. Cl.
*B62D 5/04* (2006.01)
(52) U.S. Cl. .......................................... 475/4; 475/333
(58) Field of Classification Search .................. 475/4, 475/7, 9, 151, 226, 333; 74/22 A
See application file for complete search history.

(56) References Cited

U.S. PATENT DOCUMENTS 4,526,053 A * 7/1985 Carson ..................... 74/424.92
4,834,202 A    5/1989 Shimizu
5,145,021 A * 9/1992 Nakamura et al. .......... 180/444
6,164,407 A * 12/2000 Cheng ....................... 180/444
2003/0139243 A1* 7/2003 Kapaan et al. .............. 475/149

FOREIGN PATENT DOCUMENTS

| EP | 0 667 279 B1 | 3/1997 |
| EP | 0 976 643 A2 | 2/2000 |
| EP | 1 110 845 A1 | 6/2001 |
| FR | 2 862 038 A1 | 5/2005 |

(Continued)

*Primary Examiner*—Sherry L Estremsky
*Assistant Examiner*—Edwin A. Young
(74) *Attorney, Agent, or Firm*—Oliff & Berridge, PLC

(57) ABSTRACT

To construct an electric power steering device in which the assist power decreases only the torque required for rotating the steering wheel, while the control of the steering angle of the steered wheels follows basically the rotation of the steering wheel by the driver, except when the steering angle of the steered wheels is changed by an actuation of a vehicle behavior control device, by a tie rod connecting bar supported to make a linear motion, a rotary member rotatable around the tie rod connecting bar, a rotation conversion device for converting a rotation of a steering shaft to a rotation of the rotary member, a rotation/linear motion conversion device for converting a rotation of the rotary member to a linear motion of the tie rod connecting bar, and a power assist electric motor to give a rotational force to the rotary member.

22 Claims, 16 Drawing Sheets

FOREIGN PATENT DOCUMENTS

| | | |
|---|---|---|
| JP | A-05-124524 | 5/1993 |
| JP | A 6-219287 | 8/1994 |
| JP | A 7-215226 | 8/1995 |
| JP | B2 2690230 | 8/1997 |
| JP | A 2001-219856 | 8/2001 |

* cited by examiner

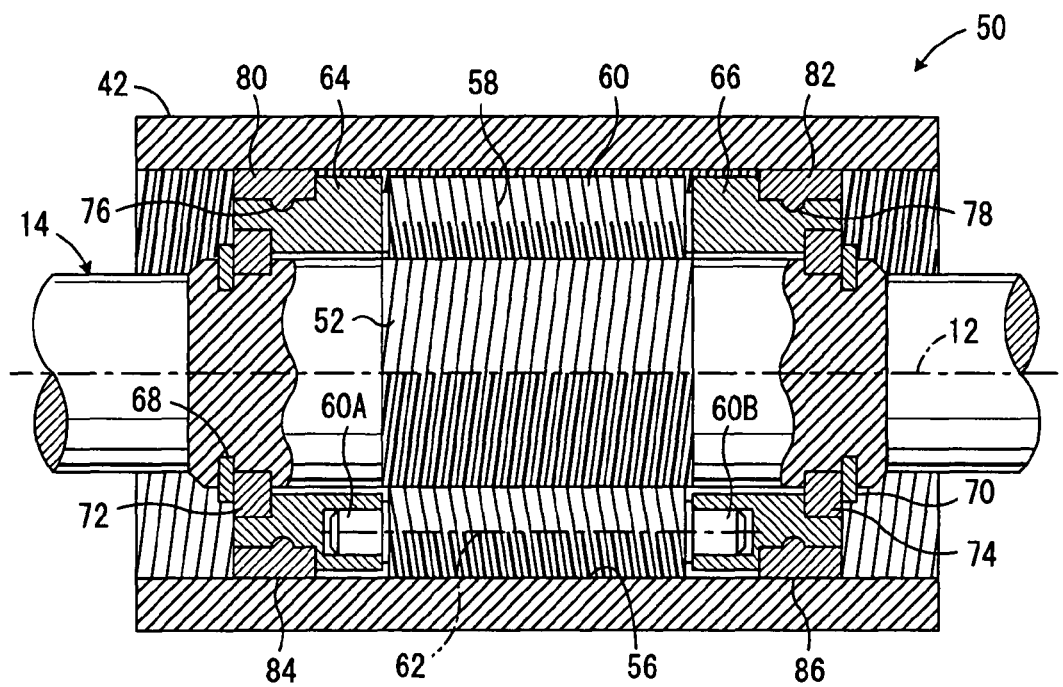
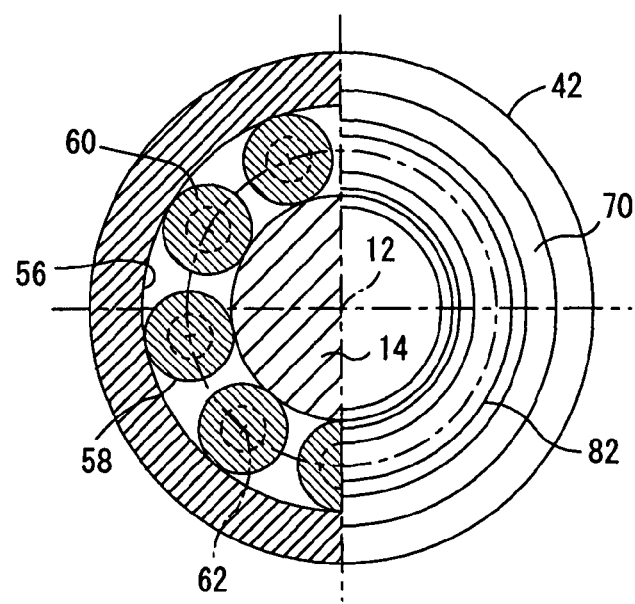
FIG. 4

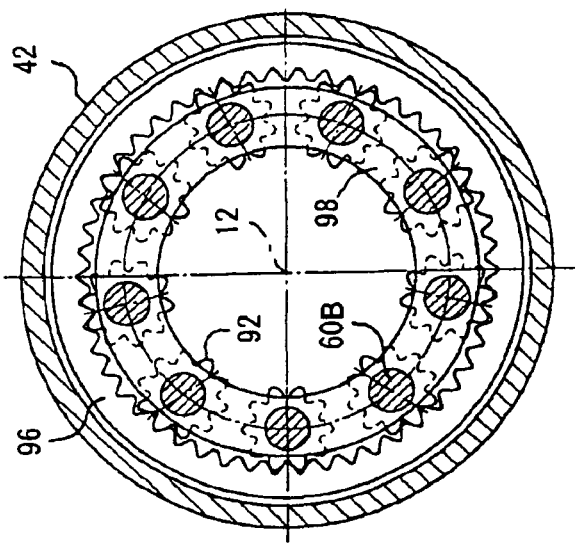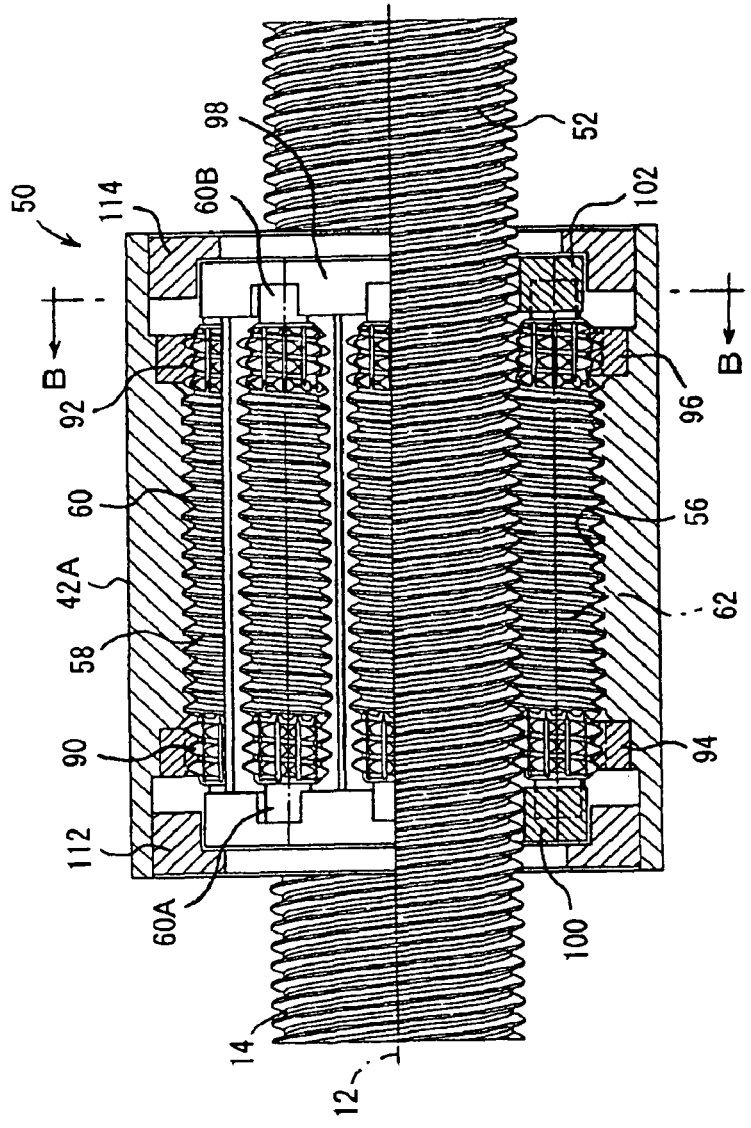

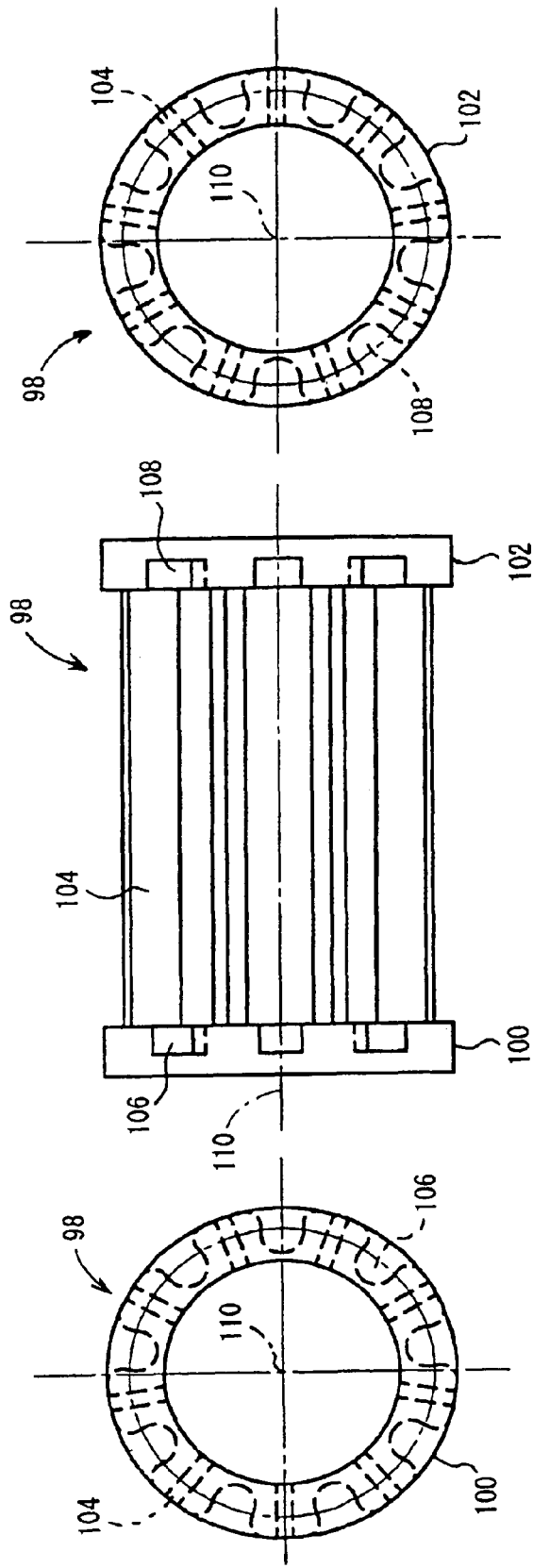

ELECTRIC POWER STEERING DEVICE FOR VEHICLES APPLYING ASSIST POWER TO ROTARY MEMBER SURROUNDING TIE ROD CONNECTING BAR

FIELD OF THE INVENTION

The present invention relates to a power steering device for vehicles, and more particularly, to an electric power steering device for vehicles.

BACKGROUND OF THE INVENTION

With regard to an electric power steering device for vehicles such as automobiles it is known as described in Japanese Patent Publication No. 2690230 (Japanese Patent Laid-open Publication Hei 5-124524) to provide a screw at a part of a linearly and rotationally movable tie rod connecting bar pivotably connected with tie rods at opposite ends thereof, and to let the tie rod connecting bar move leftward or rightward according to a turning operation of a steering shaft by driving a nut engaged around the screw, while to provide a spline at a part of the tie rod connecting bar and to selectively drive a spline nut engaging the spline by an electric motor so that the tie rod connecting bar is driven in its axial direction at the screw portion when it is rotated by the driving force of the electric motor via the spline nut.

DISCLOSURE OF THE INVENTION

In the power steering construction adapted to convert the steering assist force by an electric motor to a force for driving the tie rod connecting bar via a screw portion as in the abovementioned prior art, the relationship between the magnitude of the steering assist force and the magnitude of the steering angle is fixed.

It is a principal object of the present invention to provide a power steering device in which the assist power decreases only the torque required for rotating the steering wheel, while the control of the steering angle of the steered wheels follows basically the rotation of the steering wheel by the driver, except when the steering angle of the steered wheels is changed by an actuation of a vehicle behavior control device, as an electrically controlled device of a compact construction around the tie rod connecting bar.

It is a further object of the present invention to incorporate a steering angle modification mechanism for a vehicle behavior control in the electric power steering device of such a compact construction.

In order to accomplish the abovementioned principal object, the present invention proposes an electric power steering device for vehicles comprising a tie rod connecting bar supported to make a linear motion, a rotary member rotatable around the tie rod connecting bar, a rotation conversion device for converting a rotation of a steering shaft to a rotation of the rotary member, a rotation/linear motion conversion device for converting a rotation of the rotary member to a linear motion of the tie rod connecting bar, and a power assist electric motor to give a rotational force to the rotary member.

When the tie rod connecting bar is supported to make a linear motion, a rotary member is provided rotatable around the tie rod connecting bar, the rotation of a steering shaft is converted to a rotation of the rotary member by a rotation conversion device, a rotation/linear motion conversion device is provided to convert the rotation of the rotary member to a linear motion of the tie rod connecting bar, and a power assist electric motor is provided to give a rotational force to the rotary member as described above. the steering angle of the steered wheels is determined only according to the rotational angle of the steering shaft by the rotational angle of the steering shaft being converted to such a rotational angle of the rotary member by the rotation conversion device that is converted to a linear motion of the tie rod connecting bar, while the rotational force given by the power assist electric motor to the rotary member assists only the steering force of the driver as a force controlled independently from the rotational angle of the rotary member.

The rotation/linear motion conversion device may be a planetary gear device including a ring gear, a sun gear, a planetary pinion and a carrier supporting the planetary pinion, and in the correspondence between pitch diameters and thread numbers of the ring gear, the sun gear and the planetary pinion the thread number of either the ring gear or the sun gear is increased or decreased so that thereby an axial displacement is generated between the ring gear and the sun gear when the ring gear rotates around the sun gear with a planetary motion of the planetary pinion.

In this case, the abovementioned relative increase or decrease of the thread number may be made with respect to the ring gear, the ring gear is longer than the sun gear and the planetary pinion, and the sun gear and the planetary pinion shift in the axial direction relative to the ring gear according to a rotation of the ring gear, or the abovementioned relative increase or decrease may be made with respect to the sun gear, the sun gear is longer than the ring gear and the planetary pinion, and the ring gear and the planetary pinion shift in the axial direction relative to the sun gear according to a rotation of the ring gear.

When the thread number of the sun gear is increased by 1 relative to those of the ring gear and the planetary pinion, as viewed in a section including a central axis of the ring gear, the sun gear and the planetary pinion, the screw threads of the ring gear, the sun gear and the planetary pinion may be of a symmetrical chevron, the thread angle of the ring gear may be equal to the thread angle of addendum of the planetary pinion and the thread angle of deddendum of the sun gear, the planetary pinion may be of an involute shape of the thread angle of deddendum thereof being smaller than the thread angle of addendum thereof, and the sun gear may be of an involute shape of the thread angle of addendum thereof being larger than the thread angle of deddendum thereof. By such an arrangement, the meshing in the ring gear, the sun gear and the planetary pinion are optimized with the thread number of the sun gear being increased by 1 relative to those of the ring gear and the planetary pinion.

When the thread number of the sun gear is decreased by 1 relative to those of the ring gear and the planetary pinion, as viewed in a section including a central axis of the ring gear, the sun gear and the planetary pinion, the screw threads of the ring gear, the sun gear and the planetary pinion may be of a symmetrical chevron, the thread angle of the ring gear may be equal to the thread angle of addendum and deddendum of the planetary pinion and the thread angle of addendum of the sun gear, and the sun gear may be of an involute shape of the thread angle of deddendum thereof being smaller than the thread angle of addendum thereof. By such an arrangement, the meshing in the ring gear, the sun gear and the planetary pinion are optimized with the thread number of the sun gear being decreased by 1 relative to those of the ring gear and the planetary pinion.

Further, when the abovementioned relative increase or decrease of the thread number is made with respect to the ring gear, a set of meshing outer gears may be provided at opposing end portions of the sun gear and the planetary pinion.

When the abovementioned relative increase or decrease of the thread number is made with respect to the sun gear, a set of meshing outer gears may provided at opposing end portions of the ring gear and the planetary pinion. By such a meshing by the outer gears being made, the planetary motion among the ring gear, the sun gear and the planetary pinion is definitely ensured.

In either case, the outer gear provide at the end portion of the planetary pinion may be formed integral with a portion of the screw thread of the planetary pinion. By such an arrangement, the provision of the outer gear for the planetary pinion is simplified.

Further, the rotary member may include a sleeve portion for passing the tie rod connecting bar therethrough, and the power assist electric motor is so constructed that an armature provided along the sleeve portion is driven by an electromagnetic coil provided therearound in a cylindrical shape. By such an arrangement, the power assist electric motor is compactly incorporated in the electric power steering device for vehicles.

Further, in order to accomplish the abovementioned further object, the present invention proposes, in such an electric power steering device for vehicles as described above, the rotary member incorporates therein a differential mechanism including an input rotary member driven by the rotation conversion device, an output rotary member to drive the rotation/linear motion conversion device, and an intermediate rotary member to variably adjust relative rotation between the input rotary member and the output rotary member, and an active steering may be conducted by variably adjusting a rate of conversion of a rotation of the steering shaft to a linear motion of the tie rod connecting bar according to a rotational displacement of the intermediate rotary member.

By the rotary member incorporating such a differential mechanism as described above, the active steering described above becomes possible so that the steering angle of the steered wheels is automatically modified by a microcomputer for the automatic behavior control of the vehicle against an oversteer or understeer tendency in the turn running of the vehicle or the split road surface which presents different friction resistances to the left and right wheels.

The differential device may be a planetary gear device including a carrier serving as the input rotary member connected with the rotation conversion device, a sun gear serving as the output rotary member connected with the rotation/linear motion conversion device, and a ring gear serving as the intermediate rotary member driven by an electric motor for the active steering including an armature mounted therearound and an electromagnetic coil surrounding the armature to conduct the active steering.

Or, the differential device may include a pair of co-axial bevel gears, a bevel pinion positioned between the pair of bevel gears and meshing therewith, and a carrier supporting the bevel pinion to revolve around the axis of the pair of bevel gears, one of the pair of bevel gears serving as the input rotary member connected with the rotation conversion device, the carrier serving as the output rotary member connected with the rotation/linear motion conversion device, and the other of the pair of bevel gears serving as the intermediate rotary member driven by an electric motor for active steering to conduct the active steering. By such an arrangement, the abovementioned planetary gear device is replaced by an axially multi-layered construction so as to suppress the increase of the diametrical size of the construction around the tie rod connecting bar.

In this case, the intermediate rotary number may be driven by the electric motor for active steering by way of a worm and a wo fatrm gear. By such an arrangement, the active steering electric motor can be positioned as displaced from the differential device along the tie rod connecting bar, thereby suppressing the increase of the diametrical size of the construction around the tie rod connecting bar, and it can be prevented that the non-energized active steering motor is reversedly driven by the steered wheels.

BRIEF DESCRIPTION OF THE DRAWINGS

FIG. 3 is an enlarged sectional view showing the planetary differential screw type rotation/linear motion conversion device shown in FIG. 2.

FIG. 4 is an enlarged sectional view showing a section perpendicular to the axis of the planetary differential screw type rotation/linear motion conversion device.

FIG. 8 is enlarged sectional views showing the planetary differential screw type rotation/linear motion conversion device shown in FIG. 7, wherein (A) is a sectional view by a section including the axis, and (B) is a sectional view by a section along the line B-B in (A) with the tie rod connecting bar being removed.

FIG. 10 is a front view (A), left side view (B) and right side view (C) of the carrier shown in FIG. 7.

BEST MODE EMBODIMENTS OF THE INVENTION

In the following, the present invention will be described in detail with respect to some preferred embodiments by referring to the accompanying drawings.

Figure 1:
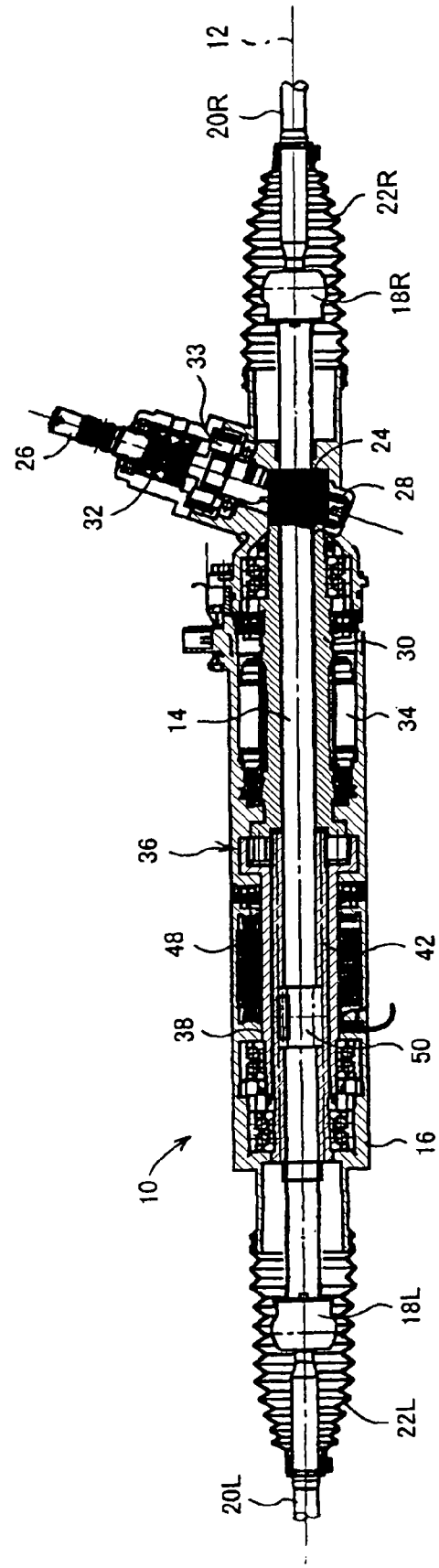
FIG. 1 is a sectional view showing the embodiment 1 of the electric power steering device for vehicles according to the present invention as a whole.
Figure 2:
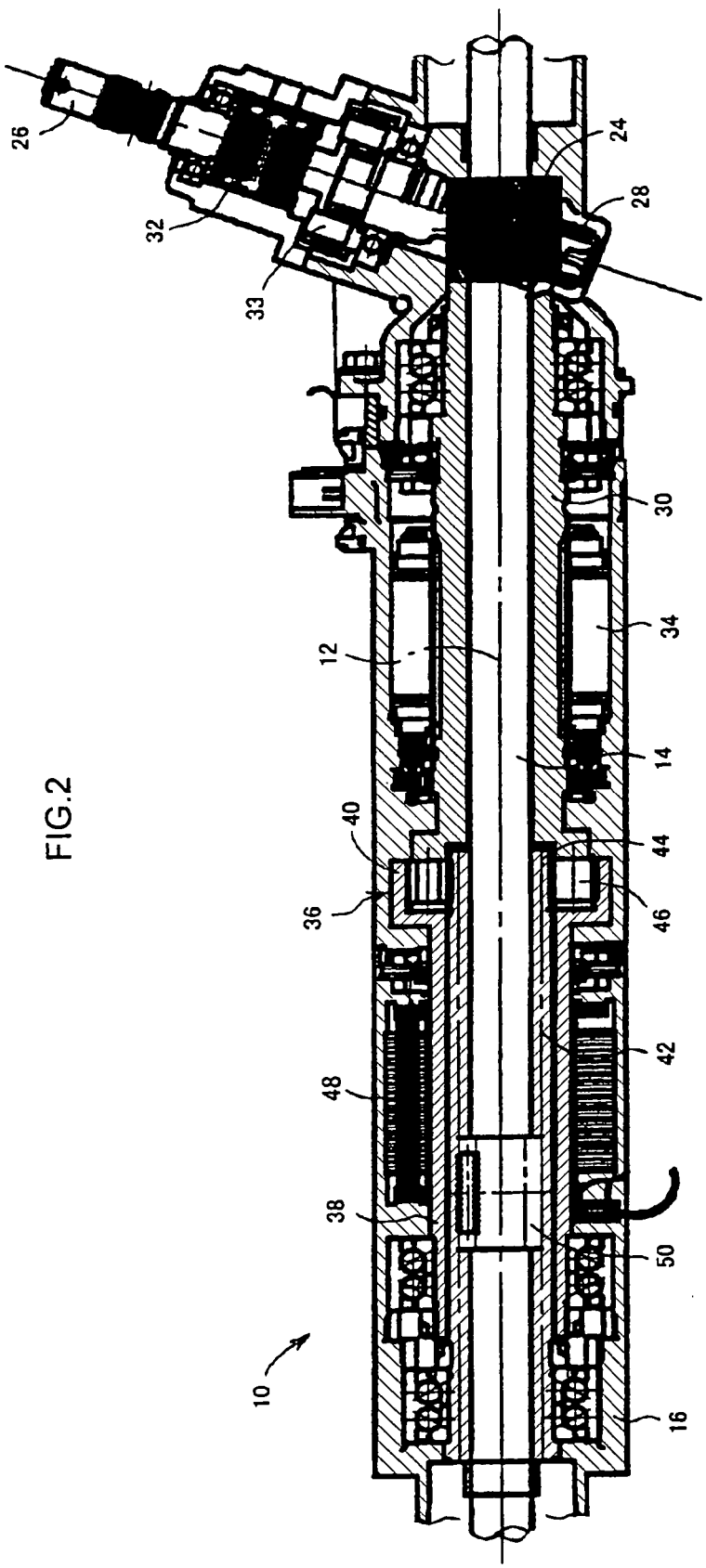
FIG. 2 is an enlarged sectional view showing the essential portions of the embodiment 1.

FIG. 1 is a sectional view showing the electric power steering device according to the present invention as a whole, and FIG. 2 is a sectional view showing the essential portions of the construction shown in FIG. 1 in a larger scale.

In these figures, the steering device totally indicated by 10 includes a tie rod connecting bar 14 extending in the lateral direction of the vehicle along an axis 12. The tie rod connecting bar 14 has a substantially rectangular cross-section at opposite ends thereof and is supported to be able to reciprocate along the axis 12 but not rotatable around the axis 12. The tie rod connecting bar 14 is pivotably connected with left and right tie rods 20L and 20R at the opposite ends thereof by way of ball joints 18L and 18R, respectively. Dust boots 22L and 22R are expanded between a housing 16 and the tie rods 20L and 20R.

The tie rod connecting bar 14 is engaged with a tubular worm gear 24 rotatable relative thereto. The worm gear 24 is engaged with a worm 28 connected at the lower end of a worm shaft 26. The worm gear 24 is formed as integral with one end of a rotary sleeve 30 rotatably engaged around the tie rod connecting bar 14. Thus, the worm 28 and the worm gear 24 construct a rotation conversion mechanism for converting the rotation of the worm shaft 26 to the rotation of the rotary sleeve 30 around the axis 12.

Within the portion of the housing 16 rotatably receiving the worm shaft 26 there are provided a torque sensor 32 for detecting the torque acting at the worm shaft 26 and a multiplying gear 33 for transmitting the rotation of the worm shaft 26 to the worm 28 by multiplying the rotational speed. The multiplying gear 33 is constructed by a planetary gear device in the shown embodiment.

Within the housing 16 there is provided an electric motor 34 arranged around the rotary sleeve 30 for applying a steering assist torque thereto. In the shown embodiment, the electric motor 34 has an armature including a plurality of permanent magnets fixed around the rotary sleeve 30, and a plurality of electromagnetic coils disposed around the rotary sleeve 30 as supported by the housing 16, forming a co-axial construction with the tie rod connecting bar 14.

A planetary gear device 36 is provided at the other end of the rotary sleeve 30. The planetary gear device 36 is composed of an inner gear 40 formed integrally at one end of an outer rotary sleeve 38 supported by the housing 16 to be rotatable around the axis 12, a sun gear 44 formed integrally with one end of an inner rotary sleeve 42 supported to be rotatable around the axis 12 at the inside of the outer rotary sleeve 38 and at the outside of the tie rod connecting bar 14, and a plurality of planetary pinions 46 rotatably supported by the other end of the rotary sleeve 30 serving as a carrier. In the normal steering operation, the planetary gear device 36 transmits the rotation of the rotary sleeve 30 to the inner rotary sleeve 42 by multiplying the speed of rotation.

Inside the housing 16 there is further provided an electric motor 48 as disposed around the outer rotary sleeve 38 for the active steering of controlling the steering gear ratio or the steering angle of the steered wheels. In the embodiment 1 herein shown the electric motor 48 also has an armature including a plurality of permanent magnets fixed around the outer rotary sleeve 38 and a plurality of electromagnetic coils supported by the housing 16 as disposed around the outer rotary sleeve 38, adapted to operate around the same axis as the tie rod connecting bar 14. In the normal steering condition, the electric motor 48 holds the outer rotary sleeve 38 in the standstill condition not to rotate, and when the steered wheels are to be actively steered, it rotates the outer rotary sleeve 38.

At the inside of the inner rotary sleeve 42 there is provided a planetary differential type rotation/linear motion conversion device 50. As described in detail hereinbelow, the rotation/linear motion conversion device 50 converts a rotational motion of the inner rotary sleeve 42 to a linear motion of the tie rod connecting bar 14 along the axis 12 but does not convert a linear motion of the tie rod connecting bar 14 to a rotational motion of the inner rotary sleeve 42.

As shown in detail in FIGS. 3 and 4, the rotation/linear motion conversion device 50 includes a male screw 52 formed at a part of the tie rod connecting bar 14 to extend along the axis 12, a female screw 56 formed at a part of the inner rotary sleeve 42 to extend along the axis 12, and a plurality of planetary screw rollers 60 disposed between the male screw 52 and the female screw 56 to mesh therewith. The respective planetary screw rollers 60 extend in parallel with the axis 12, to be of the same as or a shorter length than the male screw 52. In the shown embodiment, the planetary screw rollers 60 are provided in the number of nine as equally spaced around the axis 12. The respective planetary screw rollers 60 have each columnar shaft portions 60A and 60B at opposite end portions thereof supported by annular carriers 64 and 66 surrounding the tie rod connecting bar 14, respectively, to be rotatable around its own axis 62 and also to revolve around the axis 12, but not to shift in the axial direction relative to the tie rod connecting bar 14.

The carriers 64 and 66 have each an inner diameter larger than the male screw 52 and an outer diameter smaller than the female screw 56, and are rotatable around the axis 12 relative to the tie rod connecting bar 14 and the inner rotary sleeve 42. The carriers 64 and 66 are made of a material of low friction coefficient such as an oil permeable metal, and are held against axial movement relative to the tie rod connecting bar 14 by stopper rings 72 and 74 fixed to the tie rod connecting bar 14 by C-rings 68 and 70, respectively.

The carriers 64 and 66 have sleeve portions formed with annular grooves 76 and 78 extending along the circumference thereof, respectively, and packing members 80 and 82 made of a material having a rubber-like elasticity such as resin or rubber are mounted around the sleeve portions for preventing foreign materials to invade thereacross with annular convex portions thereof being engaged in the annular grooves 76 and 78 in a manner of allowing removal thereof for the purpose of exchange. The parking members 80 and 82 have male screws 84 and 86, respectively, engaging the female screw 56 in a condition elastically pressed thereto.

The female screw 56 of the inner rotary sleeve 42 and the male screw 58 of the planetary screw roller 60 are spiraled in the same direction, while the male screw 52 of the tie rod connecting bar 14 is spiraled in the direction opposite thereto. When the inner rotary sleeve 42 (female screw 56) rotates around the axis 12 relative to the tie rod connecting bar 14, the planetary screw roller 60 (male screw 58) rotates relative to the inner rotary sleeve 42 (female screw 56) and the tie rod connecting bar 14 (male screw 52) while meshing with these by their threads without slipping relative thereto.

Such a revolving of the planetary screw rollers 60 relative to the inner rotary sleeve 42 and the tie rod connecting bar 14 while meshing with these by their threads without slipping relative therebetween is available by properly setting the relationship between the pitch angle and the friction coefficient in the meshing between the respective threads.

Figure 5:
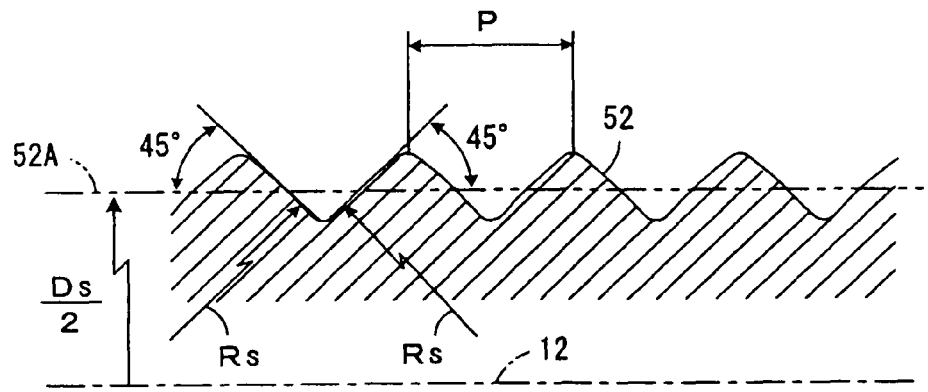
FIG. 5 is an enlarged partial sectional view showing the male screw of the tie rod connecting bar in a section including the axis thereof.

FIG. 5 is an enlarged partial sectional view showing the male screw 52 of the tie rod connecting bar 14 in a section including the axis 12. In FIG. 5, the two-dots-dash line 52A indicates the position of the pitch diameter of the male screw 52. As shown in FIG. 5, the male screw 52 has a thread shape of chevron of substantially isosceles triangle of a 90° apex angle with the apex being rounded, extending in spiral around the axis 12. The thread of the male screw 52 is formed such that it is not symmetrical when viewed in a section perpendicular to the direction of extension thereof but symmetrical as viewed in a section including the axis 12. Further, the slopes of the thread shape of the male screw 52 are each formed in an arc of a radius Rs, such that the angle of slope at the position of the pitch diameter 52A is 45° against the axis 12 as viewed in the section including the axis 12.

The female screw 56 of the inner rotary sleeve 42 and the male screw 58 of the planetary screw roller 60 are formed in the same manner as the male screw 52 of the tie rod connecting bar 14, such that the male screw 52 and the male screw 58 as well as the male screw 58 and the female screw 56 mesh with each other by maintaining a substantially point contact with each other at a plurality of positions spaced from one another as much as the pitch of the threads in the axial direction. The male screws 84 and 86 of the packing members 80 and 82 have each a cross section to substantially tightly contact with the female screw 56 of the inner rotary sleeve 42.

The male screw 52 of the tie rod connecting bar 14, the female screw 56 of the inner rotary sleeve 42 and the male screw 58 of the planetary screw rollers 60 are multi-thread screws of the same pitch, but the number of thread of the female screw 56 is increased or decreased by 1 from such a relationship between the pitch diameter and the number of thread among the male screw 52, the male screw 58 and the female screw 56 that no axial shifting of the tie rod connecting bar 14 and the planetary screw rollers 60 relative to the inner rotary sleeve 42 occurs in spite of a rotation of the inner rotary sleeve 42. In other words, the number of thread differential of the female screw 56 is +1 or −1.

In more detail, denoting the pitch diameters of the male screw 52 of the tie rod connecting bar 14, the male screw 58 of the planetary screw rollers 60 and the female screw 56 of the inner rotary sleeve 42 as Ds, Dp and Dn, respectively, and the numbers of thread of the male screw 52, the male screw 58 and the female screw 56 as Ns, Np and Nn, respectively, the relationship between the pitch diameters and the numbers of thread of the male screw 52, the male screw 58 and the female screw 56 which generates no axial shifting among the tie rod connecting bar 14, the planetary screw rollers 60 and the inner rotary sleeve 42 is to satisfy Ns:Np:Nn=Ds:Dp:Dn, while the number of thread of the female screw 56 is made larger or smaller by 1 than the value which satisfies the abovementioned condition. In the shown embodiment 1, the number of thread differential is set to −1.

Thus, the male screw 52 of the tie rod connecting bar 14, the male screw 58 of the planetary screw rollers 60, the female screw 56 of the inner rotary sleeve 42 and the carriers 64 and 66 construct, in cooperation, not only the same reduction mechanism as a planetary gear reduction mechanism but also a differential screw mechanism to generate an axial shifting of the tie rod connecting bar 14 along the axis 12 by the rotation of the inner rotary sleeve 42.

Figure 6A:
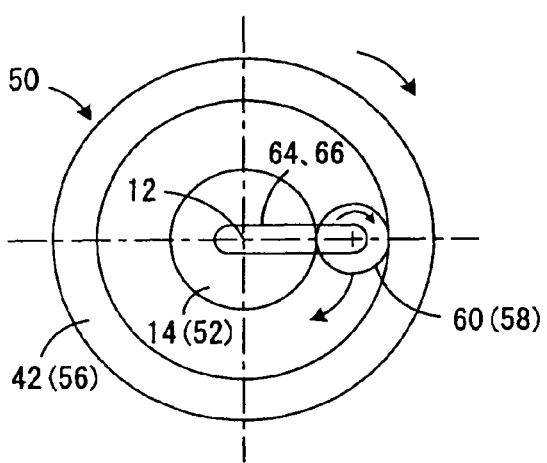
FIG. 6 is a diagrammatic illustration showing the principle of operation of the rotation/linear motion conversion device of the embodiment 1, wherein (A) shows the rotational directions of the tie rod connecting bar, the inner rotary sleeve, the planetary screw roller and the carrier as reviewed from the right side of the rotation/linear motion conversion device in FIG. 3, and (B) shows the direction of the relative axial displacement of the tie rod connecting bar and the planetary screw roller of the rotation/linear motion conversion device in a perspective view from right up of FIG. 3.
Figure 6B:
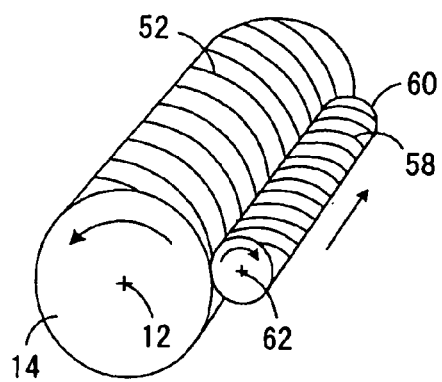

FIG. 6 is diagrammatical views showing the principle of operation of the rotation/linear motion conversion device 50 of the embodiment 1, in which FIG. 6 (A) shows the directions of rotation of the tie rod connecting bar 14 (male screw 52), the inner rotary sleeve 42 (female screw 56), the planetary screw roller 60 (male screw 58) and the carriers 64 and 66 as viewed from the right side of the rotation/linear motion conversion device 50 in FIG. 3, and FIG. 6 (B) is a perspective view from the right up of FIG. 3 of the tie rod connecting bar 14 (male screw 52) and the planetary screw roller 60 (female screw 58) of the rotation/linear motion conversion device 50 with the carriers 64 and 66 being fixed.

Referring to FIG. 6 (A), since the tie rod connecting bar 14 (male screw 52) does not rotate, when the inner rotary sleeve 42 (female screw 56) rotates around the axis 12 in the clockwise direction, each planetary screw roller 60 (male screw 58) revolves around the tie rod connecting bar 14 (male screw 52) in the clockwise direction, while rotating around its own axis 62 in the clockwise direction, and the carriers 64 and 66 rotate around the axis 12 in the clockwise direction.

Referring to FIG. 6 (B), if it is assumed that the carriers 64 and 66 are fixed, when the planetary screw roller 60 (male screw 58) having a right-handed screw rotates around its own axis 62 while rolling along the inside of the inner rotary sleeve 42 (female screw 56), the planetary screw roller 60 (male screw you 58) makes an axial displacement rearward in the figure as shown by an arrow corresponding to the thread differential of −1. According to the clockwise rotation of the planetary screw roller 60 the thread 56 thereof thrusts the male screw 52 of the tie rod connecting bar 14 forward in the figure, but when the planetary roller 60 (male screw 58) rotates clockwise around its own axis 62, the tie rod connecting bar 14 (male screw 52) rotates anticlockwise around the axis 12, thereby shifting rearward in the figure relative to the planetary screw roller 60 (male screw 58), so as to cancel the forward thrusting by the planetary screw roller 60 (male screw 58). Therefore, the tie rod connecting bar 14 (male screw 52) shifts rearward in the figure together with the planetary screw roller 60 (male screw 48) relative to the inner rotary sleeve 42 (female screw 56). Thus, the tie rod connecting bar 14 (male screw 52) shifts rearward in the figure relative to the inner rotary sleeve 42 (female screw 56) together with the planetary screw roller 60 (male screw view 58)

When the thread differential of the inner rotary sleeve 42 (female screw 56) is +1, the planetary screw roller 60 (male screw 58) and the tie rod connecting bar 14 (male screw you 52) shift forward in the figure according to the rotation of the inner rotary sleeve 42 (female screw 56) in the same direction as described above.

The magnitude of the axial displacement of the planetary screw roller 60 (male screw 58) and the tie rod connecting bar 14 (male screw 52) relative to the inner rotary sleeve 42 (female screw 56) is one thread pitch per one revolution of planetary screw roller 60 (male screw 58) relative to the inner rotary sleeve 42 (female screw 56). Denoting the pitch diameters of the inner rotary sleeve 42 (female screw 56) and the tie rod connecting bar 14 (male screw 56) as Dn and Ds, respectively, the number of revolution of the planetary screw roller 60 (male screw 58) relative to the inner rotary sleeve 42 (female screw 56) per one rotation of the inner rotary sleeve 42 (female screw 56) is Dn/(Ds+Dn). Therefore, when the pitch of the threads is P, the axial displacement Ls of the tie rod connecting bar 14 (male screw 52) per one rotation of the inner rotary sleeve 42 (female screw 56) is such as Ls=P·Dn/(Ds+Dn).

As an example, if it is assumed that in the shown embodiment the pitch P is 1 mm, the male screw 58 of the planetary screw roller 60 is a right-handed 4 thread screw (Np=4) of a pitch diameter 7 mm, and the pitch diameter Ds of the left-handed male screw 52 of the tie rod connecting bar 14 is 2.5 times that of the planetary screw roller 60 such as Ds=17.5 mm having a thread number Ns satisfying the condition of generating no relative axial displacement between the tie rod connecting bar 14 (male screw 52) and the planetary screw roller 60 (male screw 58), such as 2.5×4=10, the pitch diameter Dn of the female screw 56 of the inner rotary sleeve 42 is 4.5 times that of the male screw 58 of the planetary screw roller 60 such as 31.5 mm, and if the thread number Nn of the right-handed female screw 56 of the inner rotary sleeve 42 is less by 1 than the thread number which satisfies the condition of generating no axial displacement between the planetary screw roller 60 and the inner rotary sleeve 42, Nn is 4.5×4−1=17, whereby the axial displacement Ls of the tie rod connecting bar 14 per one rotation of the inner rotary sleeve 42 is 31.5/(31.5+17.5)=0.643 mm.

In the shown embodiment 1, the number of the planetary screw rollers 60 is 9, which is the quotient of dividing the sum of the thread numbers of the tie rod connecting bar 14 (male screw 52) and the inner rotary sleeve 42 (female screw 56), i.e. 27, by an integer 3. When the number of the planetary screw rollers 60 is an integer quotient (positive integer) dividing the sum of the thread numbers of the tie rod connecting bar 14 (male screw 52) and the inner rotary sleeve 42 (female screw 56) by an integer, the planetary screw rollers 60 are disposed as uniformly spaced around the axis 12.

Thus, in the shown embodiment 1, in the normal steering operation in which no active steering or control of the steering gear ratio is executed, the rotation of the worm shaft 26 by the steering operation of the driver is converted to the rotation of the rotary sleeve 30 around the axis 12 by the worm 28 and the worm gear 24, then the rotation of the rotary sleeve 30 is transmitted to the inner rotary sleeve 42 as multiplied in rotation thereof by the planetary gear device 36, then the rotation of the inner rotary sleeve 42 is converted to the linear motion of the tie rod connecting bar 14 along the axis 12 by the rotation/linear motion conversion device 50, and then the linear motion of the tire rod connecting bar 14 is transmitted to the left and right tie rods and 20L and 20R by way of the ball joints 18L and 18R, so that the left and right steered wheels not shown in the figure are steered.

In this case, the steering torque is detected by the torque sensor 32, then a target value of the steering assist torque is calculated by an electronic control device not shown in the figure based upon at least the steering torque, then a target value of electric current for the electric motor 34 is calculated based upon the target value of the steering assist torque, and then the target current is supplied to the electric motor 34, whereby a rotational force is given to the rotary sleeve 30 by the electric motor 34, so as to assist the driver by decreasing the steering load.

When the control of the active steering of the steered wheels is executed, a target electric current corresponding to the target steering angle of the left and right steered wheels is supplied to the electric motor 48 by the electronic control device not shown in the figure, whereby the outer rotary sleeve 38 is rotated, so that the amount and/or direction of the rotation transmitted from the rotary sleeve 30 to the inner rotary sleeve 42 by way of the planetary gear device 36 is changed, so that thereby the amount and/or direction of the linear motion converted from the inner rotary sleeve 42 to the tie rod connecting bar 14 by the rotation/linear motion conversion device 50 is changed, so that thereby the steering angle of the steered wheels is increased or decreased from the value thereof in the normal steering operation.

Therefore, according to the shown embodiment 1, the active steering of the steered wheels is accomplished by the outer rotary sleeve 38 being appropriately rotated by the electric motor 48 in the process of the rotation transmitted from the rotary sleeve 30 to the inner rotary sleeve 42 by way of the planetary gear device 36 under the assist of the power assisting electric motor 34 is converted to the linear motion of the tie rod connecting bar 14 by the rotation/linear motion conversion device 50.

In this case, according to the shown embodiment 1, since the power assisting electric motor 34 is provided on the side of the worm shaft 26 as viewed from the planetary gear device 36, it is suppressed that the change of the steering torque by the active steering is transmitted to the steering wheel.

According to the shown embodiment 1, the conversion efficiency of the rotation/linear motion conversion device 50 in the normal direction can be made a high value such as 80% while making the conversion efficiency in the reversed direction to be 0, so that the rotation of the inner rotary sleeve 42 can be converted to the linear motion of the tie rod connecting bar 14 at a high efficiency, while it is effectively prevented that the linear motion of the tie rod connecting bar 14 is converted to the rotational motion of the inner rotary sleeve 42, whereby even when the tie rod connecting bar 14 is urged in the linear direction by an external force acting at the steered wheels from the road surface, the inner rotary sleeve 42 is never rotated thereby, definitely preventing that the steering angle of the steered wheels is changed by an external force from the road surface.

According to the shown embodiment 1, the rotation of the rotary sleeve 30 is of a relatively high speed multiplied from the rotation of the worm shaft 26 by the rotation multiplying device 33, and therefore, the power assist electric motor 34 for giving a rotational force to the rotary sleeve 30 may be of a high rotation/low output force.

As described above, the engagement between the female screw 56 of the inner rotary sleeve 42 and the male screw 58 of the planetary screw roller 60 is not the "screw engagement" but the "gear meshing engagement" of the two helical gears different in the lead angle and the number of thread from one another. When two helical gears different in the lead angle from one another rotate in meshing engagement, a thrusting acts therebetween. The planetary screw roller 60 can makes a thrust displacement relative to the inner rotary sleeve 42. The efficiency of such a thrust displacement is available at a value higher than 80%.

According to the shown embodiment 1, since the friction force in the rolling motion of the male screw 58 of the planetary screw roller 60 along the female screw 56 of the inner rotary sleeve 42 and the male screw 52 of the tie rod connecting 14 is smaller than the friction force of the male screw 58 of the planetary screw roller 60 sliding relative to the female screw 56 of the inner rotary sleeve 42 and the male screw 52 of the tie rod connecting bar 14, the rotation of the inner rotary sleeve 42 around the tie rod connecting bar 14 is correctly converted to the axial motion of the tie rod connecting bar 14 relative to the inner rotary sleeve 42.

According to the shown embodiment 1, since the inner rotary sleeve 42, the planetary screw roller 60 and the tie rod connecting bar 14 are held against the relative shifting in the axial direction by the screw meshing, it is definitely prevented that the relative sliding occurs therebetween in the axial direction.

According to the shown embodiment 1, since the male screw 52 of the tie rod connecting bar 14, the male screw 58 of the planetary screw roller 60 and the female screw 56 of the inner rotary sleeve 42 are each symmetrical as viewed in the section including the axis thereof, they engaged uniformly with one another.

According to the shown embodiment 1, since the packing members 80 and 82 are provided in a tight engagement with the female screw 56 of the inner rotary sleeve 42 by the screw tightly engaging therewith, it is definitely prevented that a foreign material invades into the meshing portion between the female screw 56 of the inner rotary sleeve 42 and the male screw 58 of the planetary screw roller 60. Since the packing members 80 and 82 are formed of a material of low friction coefficient such as a metal containing oil, the planetary screw rollers 60 are supported to rotate smoothly around each axis 62 thereof, whereby good durability and silence in operation are ensured.

Figure 7:
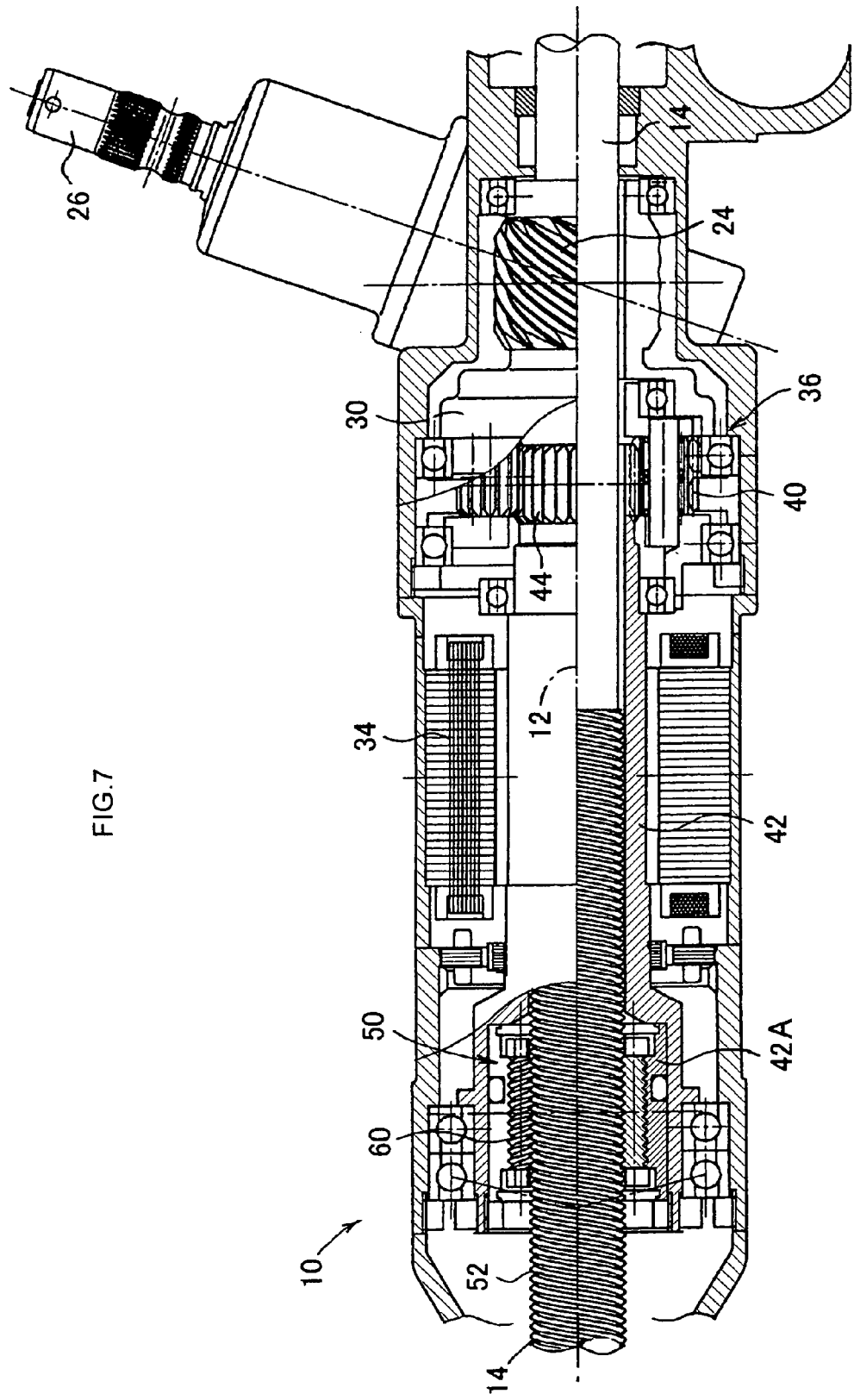
FIG. 7 is an enlarged sectional view of the embodiment 2 of the electric power steering device for vehicles according to the present invention.

FIG. 7 is a longitudinal sectional view showing the essential portions of the embodiment 2 of the electric power steering device for vehicles according to the present invention, FIG. 8 (A) is a longitudinal sectional view showing the planetary differential screw type rotation/linear motion conversion device shown in FIG. 7 in a larger scale, and FIG. 8 (B) is a cross sectional view by line B-B in FIG. 8(A). In FIG. 8 (B) the tie rod connecting bar 14 is removed. In these figures, the portions corresponding to those shown in FIGS. 1-4 are designated by the same reference numerals as in FIGS. 1-4.

The steering device 10 of this embodiment 2 is applied to the vehicle in which the active steering is not executed and the power assist only is executed. In this embodiment 2, therefore, no electric motor corresponding to the electric motor 48 for the active steering in the embodiment 1 is provided, and an outer rotary member 42A of the rotation/linear motion conversion device 50 is an end portion of a rotary member which is an integral member corresponding to a combination of the inner rotary sleeve 42 and the rotary sleeve 30 in the embodiment 1.

Figures 9A, 9B, 9C:
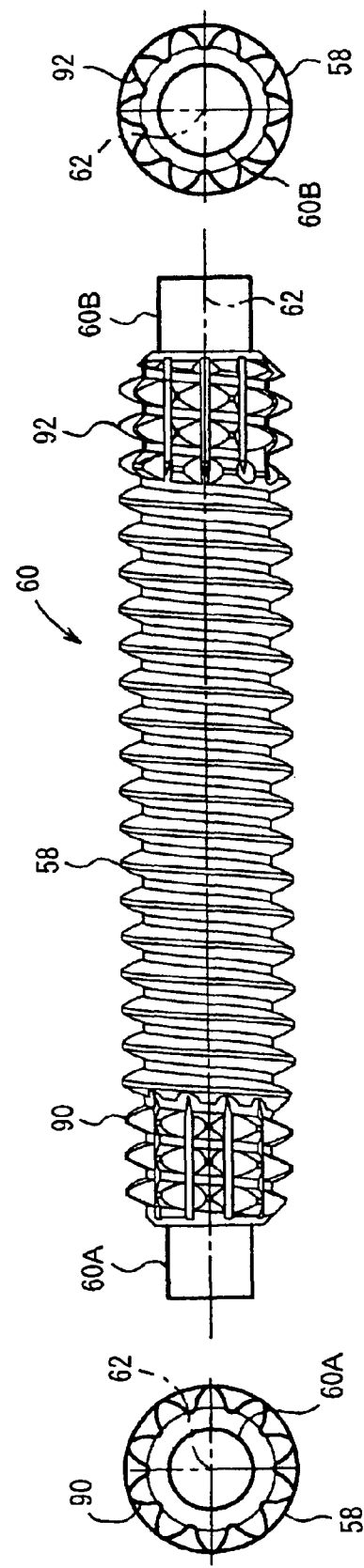
FIG. 9 is an enlarged front view (A), left side view (B) and right side view (C) of the planetary screw roller shown in FIG. 7.
Figure 11A:
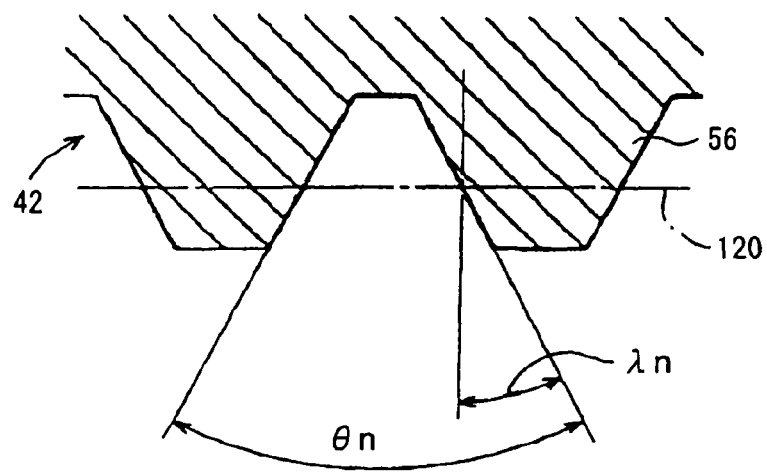
FIG. 11 is enlarged partial sectional views of the respective screws shown in FIG. 7, wherein (A) shows the female screw of the outer rotary member, (B) shows the male screw of the planetary screw roller and (C) shows the male screw of the tie rod connecting bar.
Figure 11B:
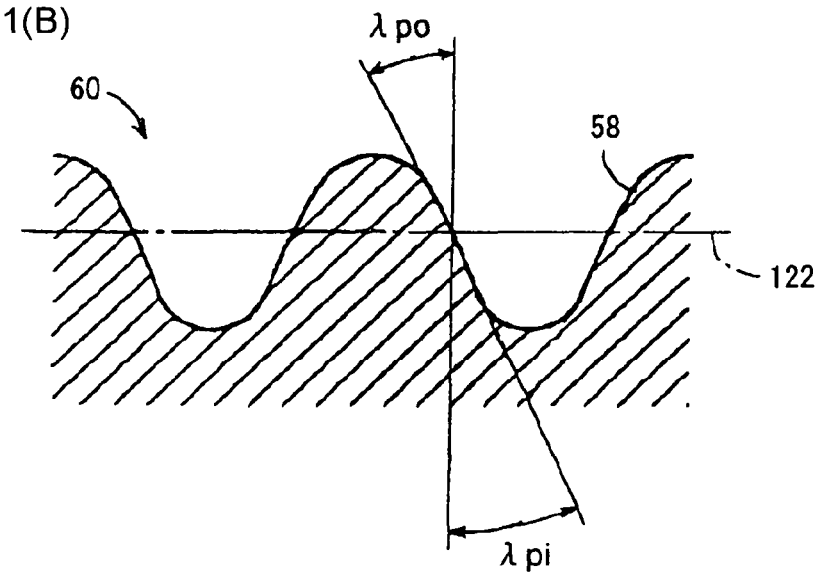
Figure 11C:
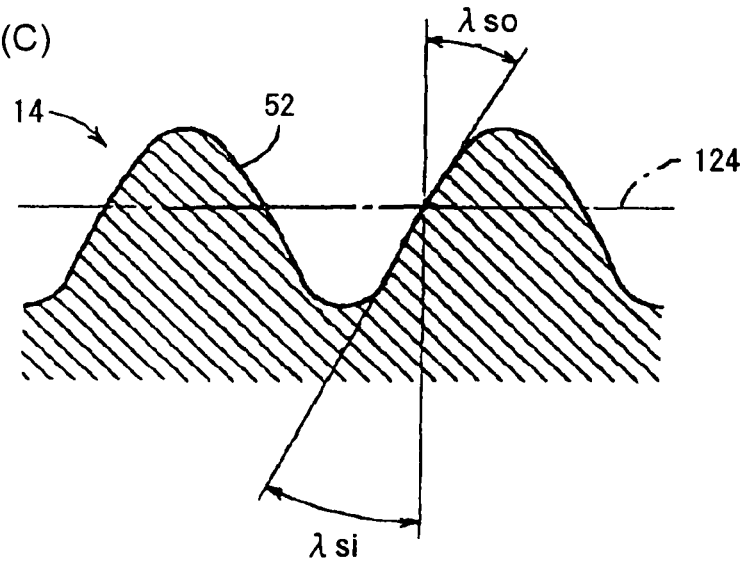

FIG. 9 shows the planetary screw roller shown in FIG. 7 in a larger scale, wherein (A) is a front view, (B) is a left side view and, and (C) is a right side view. FIG. 10 shows the carrier shown in FIG. 7, wherein (A) is a front view, (B) is a left side view and, and (C) is a right side view. FIG. 11 shows the thread in a section including the axis thereof, wherein (A) shows the female screw of the outer rotary member 42A, (B) shows the male screw of the planetary screw roller, and (C) shows the male screw of the tie rod connecting bar 14.

The rotation/linear motion conversion device 50 of this embodiment 2 is constructed basically in the same manner as the motion conversion device 50 of the abovementioned embodiment 1, except that the male screw 52 of the tire rod connecting bar 14 is much longer than the outer rotary member 42A and the planetary screw rollers 60, and that the male screw 52 reciprocates along the axis 12 relative to the outer rotary member 42 A and the planetary screw rollers 60.

Particularly in this embodiment 2, as shown in detail in FIG. 9, each planetary screw roller 60 has the male screw 58, spur outer gears 90 and 92 formed integrally at opposite ends of the male screw 58 and shaft portions 60A and 60B formed integrally at the outside of the outer gears 90 and 92. The shaft portions 60A and 60B are of a columnar shape different in the diameter thereof from one another for the purpose described in detail hereinbelow. In the shown embodiment, the shaft portion 60A has a smaller diameter than the shaft portion 60B. Such a relationship in the difference of diameter may be reversed.

The outer gears 90 and 92 are formed by the gear teeth being formed at the opposite end portions of the male screw 58, and therefore, the outer gears 90 and 92 have the shape that the threads of the male screw 58 extend around the axis 62 with teeth uniformly spaced with grooves around the axis 62. The height of the outer gears 90 and 92 is decreased to be a little smaller than that of the male screw 58, so that the outer diameter defined by the apexes of the outer gears 90 and 92 is a little smaller than that defined by the apex of the male screw 58.

The tooth shapes of the outer gears 90 and 92 are shifted relative to one another by a phase difference larger than 0° and smaller than 360°. The outer gears 90 and 92 are meshed with spur inner gears 94 and 96, and therefore, the tooth shapes of the inner gears 94 and 96 are also shifted relative to one another by the same phase difference as in the outer gears 90 and 92. The inner gears 94 and 96 are disposed at the outside of the female screw 56 of the outer rotary member 42A, as pressed into the bores formed therein. It is desirable that the phase difference in the outer and inner gears is larger than 90° and smaller than 270°, particularly 180° as in the shown embodiment, so that when the outer and inner gears engage at the addendum and the deddendum thereof at one end, the outer and inner gears engage at the deddendum and the addendum thereof at the other end.

The axis of the outer gears 90 and 92 is aligned with the axis 62 of the planetary screw roller 60, and the diameter of the pitch circle of the outer gears to 90 and 92 is equal to the diameter of the pitch circle of the male screw 58 of the planetary screw roller 60. The ratio of the number of teeth between the outer gears 90, 92 and the inner gears 94, 96 is equal to the ratio between the pitch circles of the male screw 58 and the female screw 56, and therefore it is equal to the ratio between the numbers of teeth of the male screw 58 and the female screw 56. The outer gears 90, 92 and the inner gears 94, 96 need not be the spur gears, and may be the helical gears of a helix angle smaller than 30°, for example, in view of the convenience of assembling.

The abovementioned construction to prevent the circumferential sliding between the planetary screw rollers 60 and the outer rotary member 42A by the meshing of the outer gears 90, 92 provided at the opposite ends of the planetary screw rollers 60 and the inner gears 94, 96 provided at the opposite ends of the female screw 56 of the outer rotary member 42A may be provided for the male screw 52 of tie rod connecting bar 14 and the male screw 58 of the planetary screw rollers 60 to prevent the circumferential sliding between the tie rod connecting bar 14 and the planetary screw rollers 60 in the construction of the embodiment 1 in which no axial displacement occurs between the male screw 52 of the tie rod connecting bar 14 and the male screw 58 of the planetary screw rollers 60, while the tie rod connecting bar 14 and the planetary screw rollers 60 shift together relative to the female screw 56 of the inner rotary sleeve 42.

Each of the planetary screw rollers 60 is supported by a carrier 98 to be rotatable around the axis 62. As shown in FIG. 10, the carrier 98 has a support ring 100 for supporting the planetary screw rollers 60 at the shaft portions 60A to be rotatable around the axes 62, a support ring 102 for supporting the planetary screw rollers 60 at the shaft portions 60B around the axes 62, and a plurality of connecting portions 104 integrally interconnecting the support rings 100 and 102.

The support rings 100 and 102 have each an inner diameter slightly larger than the outer diameter of the male screw 52 of the tie rod connecting bar 14 and an outer diameter slightly smaller than the inner diameter of the female screw 56 of the outer rotary member 42A. The support rings 100 and 102 have each a plurality of holes 106 and 108 for receiving the shaft portions 60A and 60B of the planetary screw rollers 60. Corresponding to the difference in the diameter of the shaft portions 60A and 60B, the diameter of the hole 106 is made smaller than that of the hole 108. The holes 106 and 108 are disposed as uniformly spaced around the axis 110 of the carrier 98, each being formed in the shape of substantially U open at the radially outside thereof. The connecting portions 104 are arranged radially around the axis 110 and formed in the shape of board extending in parallel to the axis 110. The carrier 98 may be made of any material such as a metal having a shape holding property and a required strength. In view of the abovementioned construction, resin is a desirable material.

Inside of the outer rotary member 42A and axially outside of the support rings 100 and 102, there are provided stopper rings 112 and 114 having an outer diameter larger than that of the support rings 100 and 102 as fixed by being pressed into the holes of the outer rotary member 42A. The stopper rings 112 and 114 have each an L-shaped sectional shape extending axially outside of the support rings 100 and 102 of the carrier 98, so as thereby to prevent that the carrier 98 shifts axially outside relative to the outer rotary member 42A.

As shown in FIG. 8, in the embodiment 2 no packing members corresponding to the packing members 80 and 82 are provided, while the support rings 100 and 102 function also as such packing members. However, packing members similar to those in the abovementioned embodiment 1 may be provided to more definitely prevent the invasion of foreign materials.

Next, the thread shapes of the female screw 56 of the outer rotary member 42A, the male screw 58 of the planetary screw roller 60 and the male screw 52 of the tie rod connecting bar 14 in this embodiment will be described.

The respective screws of the rotation/linear motion conversion device 50 must operate not only as a screw but also as a gear. In order for the respective screws to function as the screws, it is necessary that the mating screws mesh with one another properly at the position of the pitch diameter. On the other hand, in order for the respective screws to function as the gears, it is necessary that the modules of the mating screws (gears) are the same with one another and the pressure angles of the mating screws (gears) are the same with one another. However, in the rotation/linear motion conversion device 50, neither the modules nor the pressure angles of the mutually mating male screw 52 and the male screw 58 can be made the same as one another, and therefore, the teeth (threads) are liable to interfere with one another, making it least easy to assemble.

Generally, in order for two screws to mesh with one another, it is necessary that the pitch and the thread angle is the same as one another in the two screws. However, in the rotation/linear motion conversion device 50, since the number of thread of male screw 52 is increased or decreased from the number of thread responding to the ratio of the pitch diameters, if the thread angle is made the same as one another, the pressure angle which is the angle of meshing in the circumferential direction becomes different in the male screw 52 and the male screw 58.

Denoting the thread angle (pressure angle as reviewed in a section including the axis) as $\lambda$, the lead angle and the lead as $\gamma$ and L, respectively, the pitch and the number of thread as P and N, respectively, and the pitch diameter (diameter of the base pitch) as ø, the lead L, the lead angle $\gamma$, the helix angle $\beta$, and the front meshing pressure angle $\alpha$ are expressed by the following formulae:

$$L = P \cdot N \tag{1}$$

$$\gamma = \tan^{-1}\{P/(\o \cdot \pi)\} \tag{2}$$

$$\beta = 0.5\pi - \gamma \tag{3}$$

$$\alpha = \tan^{-1}\{\tan(\lambda) \cdot \tan(\beta)\} \tag{4}$$

Therefore, when the pitch P, the thread number N and the pitch diameter ø are determined, the pressure angle $\alpha$ is obtained by calculation. When it is assumed that the pitch Pp, the thread number Np and the pitch diameter øp of the planetary screw roller 60 are 1 mm, 1 and 4 mm, respectively, the ratio of the pitch diameter between the male screw 52 of the tie rod connecting bar 14 and the male screw 58 of the planetary screw roller 60 is 3:1, and the thread differential of the male screw 52 of the tie rod connecting bar 14 is +1, the lead L and the pitch diameter øs of the male screw 52 become 4 mm and 12 mm, respectively.

Therefore, when the helix angle $\beta$p of the male screw 58 of the planetary screw roller 60 is made 85.45°, the helix angle $\beta$s of the male screw 52 of the tie rod connecting bar 14 is made 83.94°, and the thread angle $\lambda$p of the male screw 58 of the planetary screw roller 60 is made 27.5°, the pressure angle $\alpha$p of the male screw 58 of the planetary screw roller 60 by the normal gears becomes 81.31°. The thread angle $\lambda$s of the male screw 52 of the tie rod connecting bar 14 to satisfy the above pressure angle is 34.76°. In such a mushing the pressure angles do not become the same with one another, leaving a difference 7.26° in the thread angle, which obstructs the meshing by interference.

Therefore, some measure is acquired to prevent the interference in the meshing and to obviate the backlash by overcoming the problem of the modules and the pressure angles of the male screw 52 of the tie rod connecting bar 14 and the male screw 58 of the planetary screw roller 60 being different form one another. The abovementioned difference in the module and the pressure angle was cause by the thread number of the male screw 52 of the tie rod connecting bar 14 was increased or decreased from the thread number corresponding to the ratio of the pitch diameters, whereby an interference occurred between the threads due to the difference in the lead angle caused by the increase or decrease of the thread number. In order to engage the screws of different lead angles properly it is important how the thread shape is designed.

Since the screws of the rotation/linear motion conversion device 50 also operates as gears, if they are viewed as gears, the threads of the planetary screw rollers 60 and the tie rod connecting bar 14 mesh with each other at the position of the pitch diameter, with the addendum of the thread of the planetary screw roller 60 meshing with the deddendum of the thread of the tie rod of connecting bar 14, while the deddendum of the thread of the planetary screw roller 60 meshing with the addendum of the tie rod connecting bar 14, according to the rotation of the planetary screw rollers 60 and the tie rod connecting bar 14. Therefore, it will be accepted that the shapes of the thread are so set up as to make such engagements to be tight.

First, a phantom thread angle is determined to be a mean value of the thread angles of the planetary screw roller 60 and the tie rod connecting bar 14, and then, by converting the phantom thread angle into the pressure angle, the value is a mean value of the pressure angles of the meshing of the two members. From this pressure angle, the thread angle of each of the two members is inversely calculated by incorporating the difference of the lead angle.

The flow of the calculation is as follows. First, a means helix angle βa is obtained from the conditions of the screws of the planetary screw roller 60 and the tie rod connecting bar 14, then a means thread angle λa is determined, and then a means pressure angle αa is calculated. Then, based upon the means pressure angle αa and the respective helix angles βp, βs, the thread angle λa of the planetary screw roller 60 and the thread angle λs of the tie rod connecting bar 14 are calculated.

Taking the abovementioned conditions of the screws as an example, according to the conditions of the screws the mean helix angle βa is calculated as follows:

$$\beta a = (\beta p + \beta s)/2$$
$$= (85.31 + 83.94)/2$$
$$= 84.70$$

When the means thread angle λa is determined as 27.5°, the means pressure angle αa is 79.89°. The thread angle λp of the planetary screw roller 60 to satisfy this pressure angle is 30.75°, and that of the tie rod connecting bar 14 is 24.05°. When the thread differential is positive, λs<λp, while when the thread differential is negative λs>λp. Therefore, when the thread differential is −1, the thread angle λp of the planetary screw roller 60 is 24.05°, and the thread angle λs of the tie rod connecting bar 14 is 30.75°.

When the calculations of the thread angles are finished, the thread shapes of the respective screws are obtained. The method of determining the thread shapes is described hereinbelow.

The rotation/linear motion conversion device 50 is a device to shift the tie rod connecting bar 14 or the outer rotary member 42A in the axial direction relative to one another. In order for the rotation/linear motion conversion device to bear of a large load and have no backlash, it is required that the thread angles of the tie rod connecting bar 14, the planetary screw roller 60 and the outer rotary member 42A are as small as possible as viewed in the section including the axis 12, the strength of the threads is high, the threads mesh with one another at the position of the pitch diameter, and the meshing engagement is tight.

The point of the rotation/linear motion conversion device being different from the conventional meshing of the spur gears is in that, while the spur gears mesh with no clearance therebetween as viewed in the section perpendicular to the axis so as to smoothly transmit the rotational motion, in the rotation/linear motion conversion device 50 it is required that the threads mesh tightly not only in the section perpendicular to the axis but also tightly in the axial direction. In other words, in the rotation/linear motion conversion device 50 the threads must engage tightly in the section perpendicular to as well as including the axis.

Moreover, although the contact portions are in the shape of helicoid centered at the axis in the conventional rotation/linear motion conversion devices by the sliding screws or ball screws, it is required in the device of the present invention that the contact portions of the threads of the tie rod connecting bar 14 and the planetary screw rollers 60 are not in the form of helicoid in order to make the reversal efficiency definitely 0. In the device according to the present invention, the threads engage with no clearance as viewed in the section including the axis 12, and the contact portions of the threads are in the radiations centered at the axis 12.

In determining the shape of the thread, the angle of the groove of the thread of the outer rotary member 42A can not be set smaller than 45° from the viewpoint of the interference of the female screw 56 of the outer rotary member 42A and the workability. Generally, it is not possible to continuously work or form the thread of the outer rotary member 42A in a straight lined shape as viewed in the section including the axis unless the thread angle is larger than 27.5°.

Moreover, the method of determining the thread shape differs according to whether the thread differential of the tie rod connecting bar 14 is positive or negative.

(1) When the Thread Differential of the Male Screw of the Tie Rod Connecting Bar is Positive.

First, the angle of the thread groove of the outer rotary member 42A is determined. The thread angle λn of the outer rotary member 42A is a. half of the angle of the thread groove.

When it is assumed that the angle of the thread groove of the outer rotary member 42A is 55°, the thread angle λn is 27.5. When the thread differential of the tie rod connecting bar 14 is positive, and the modules of the tie rod connecting bar 14 and the planetary screw rollers 60 are different from one another, the interference by such a difference occurs as concentrated at the deddendum of the planetary screw roller 60 and the addendum of the tie rod connecting bar 14. In order to calculate the means pressure angle of the threads of the planetary screw roller 60 and the tie rod connecting bar 14, the thread angle (means pressure angle λa in the section including the axis) is made 27.5°. In this case, the thread angle λpi of the deddendum of the planetary screw roller 60 is 24.05°, and the thread angle λso of the addendum of the tie rod connecting bar 14 is 30.75°.

Therefore, the threads of the planetary screw roller 60 tightly engage with the threads of the outer rotary member 42A as viewed in the section including the axis 12 when it has the thread angle λpo of 27.50 at the addendum and the thread angle λpi of 24.05° at the deddendum.

The threads of the tie rod connecting bar 14 tightly engage with the threads of the planetary screw roller 60 in both of the axial and rotational directions when it has the thread angle λso of 30.75° at the addendum and the thread angle λsi of 27.5° which is the same as the thread angle of the addendum of the outer rotary member 42A at the deddendum.

The deddendum of the planetary screw roller 60 and the addendum of the tie rod connecting bar 14 must have the same pressure angle as viewed in the section perpendicular to the axis 12 that is the direction of transmission of rotation. Moreover, the tie rod connecting bar 14 and the planetary screw roller 60 must be in the condition of continuously meshing with each other in the region inside and outside of the center petitioned of at the pitch diameter. Therefore, the mean pressure angle in the section including the axis 12 is 27.5° which is the same as the thread angle λn of the outer rotary member 42A, the thread angle λpo of the addendum of the planetary screw roller 60 and the thread angle of the deddendum of the tie rod connecting bar 14.

As will be understood from the foregoing, the thread shapes of the respective screws are most ideal when the thread angle of the outer rotary member 42A is as a small acute angle as possible within the range allowable under the conditions of working, the thread angle of the addendum of the planetary screw roller 60 and the thread angle of the deddendum of the tie rod connecting bar 14 are the same as the thread angle of the outer rotary member 42A, and the thread angle of the deddendum of the planetary screw roller 60 and the thread angle of the addendum of the tie rod connecting bar 14 are the same as the thread angle of the outer rotary member 42A in the mean value thereof.

Therefore, in the case of the abovementioned example, the desirable thread angles of the respective screws are as follows.

thread angle $\lambda n$ of outer rotary member 42A = thread angle $\lambda po$ of addendum of planetary screw roller 60 = thread angle $\lambda si$ of deddendum of tie rod connecting bar 14 = 27.5° thread angle $\lambda pi$ of dedendum of planetary screw roller 60 = 24.05° thread angle $\lambda so$ of addendum of tie rod connecting bar 14 = 30.75°

The thread shapes of the respective screws are modified by the involute functions not to interfere with one another in the rotation.

(2) When the Thread Differential of the Tie Rod Connecting Bar 14 is Negative.

In this case also, the thread angle $\lambda n$ of the outer rotary member 42A is restricted by the angle of the groove of the thread. When the thread differential of the tie rod connecting bar 14 is negative and the modules of the tie rod connecting bar 14 and the planetary screw roller 60 are different from one another, the interference between the threads due to the difference occurs as concentrated at the addendum of the planetary screw roller 60 and the deddendum of the tie rod connecting bar 14.

Therefore, in the same manner as in the case where the thread differential of the tie rod connecting bar 14 is positive, when the angle of the groove of the thread of the outer rotary member 42A is assumed as 55°, the thread angle $\lambda n$ becomes 27.5°. Therefore, the thread angle $\lambda po$ of the addendum of the planetary screw roller 60 becomes also 27.5°, and since it is required that the deddendum engages tightly as viewed in the section including the axis 12, the thread angle $\lambda pi$ of the deddendum becomes also 27.5°. Further, since the addendum of the tie rod connecting bar 14 meshes with the deddendum of the planetary screw roller 60, the thread angle $\lambda so$ of the addendum of the tie rod connecting bar 14 also becomes 27.52°.

Thus, since the thread angle $\lambda si$ of the deddendum of the tie rod connecting bar 14 only is affected by the difference of the modules, it may be calculated according to the abovementioned formula 4, and the value is 19.14°.

As will be understood from the foregoing, the thread shapes of the respective screws become most ideal when the thread angle of the outer rotary member 42A is as a small acute angle as possible in the range allowed under the working, the thread angles of the addendum and the deddendum of the planetary screw roller 60 and the thread angle of the addendum of the tie rod connecting bar 14 are the same as the thread angle of the outer rotary member 42A, and the thread angle of the deddendum of the tie rod connecting bar 14 is the smaller one of the two thread angles calculated based upon the means pressure angle and the helix angle.

When the thread differential of the tie rod connecting bar 14 is negative, the thread shapes of the respective screws are also modified by the involute functions not to interfere with one another in the rotation.

FIG. 11 are enlarged sectional views along the axis of the respective screws, wherein (A) shows the female screw 56 of the outer rotary member 42A, (B) shows the male screw 58 of the planetary screw roller 60, and (C) shows the male screw 52 of the tie rod connecting bar 14. In FIG. 11, the reference numerals 120, 122 and 124 indicate the basic pitch cycles when the female screw 56, the male screw 58 and the male screw 52 are deemed as the gears.

As shown in FIG. 11, the female screw 56 of the outer rotary member 42A has a trapezoidal thread shape, and the planetary screw roller 60 and the tie rod connecting bar 14 have involute thread shapes. The thread groove of the female screw 56 of the outer rotary member 42A has an opening angle $\theta n$ (Thread angle $\lambda n$ is equal to $\theta n/2$.), and the male screw 58 of the planetary screw roller 60 has the thread angle $\lambda po$ at the addendum and the thread angle $\lambda pi$ at the deddendum which is smaller than $\lambda po$. The male screw 52 of the tie rod connecting bar 14 has the thread angle $\lambda so$ at the addendum and the thread angle $\lambda si$ at the deddendum which is smaller than $\lambda po$.

The thread differential Ns of the tie rod connecting bar 14 is +1, i.e. the number of thread of the tie rod connecting bar 14 is larger by 1 than the number of thread which satisfies the relationship between the pitch diameter and the number of thread with regard to the tie rod connecting bar 14, the planetary screw roller 60 and the outer rotary member 42A according to which no axial displacement occurs among the tie rod connecting bar 14, the planetary screw roller 60 and the outer rotary member 42A when either of the outer rotary member 42A or the tie rod connecting bar 14 is rotated, and therefore, as shown in FIG. 11, the thread angle $\lambda po$ of the addendum of the male screw view 58 of the planetary screw roller 60 is set to be the same as the thread angle $\lambda n$ of the female screw 56 of the outer rotary member 42A, and the thread angle $\lambda si$ of the deddendum of the male screw 52 of the tie rod connecting bar 14 is also set to be the same as.$\lambda n$.

Figure 12A:
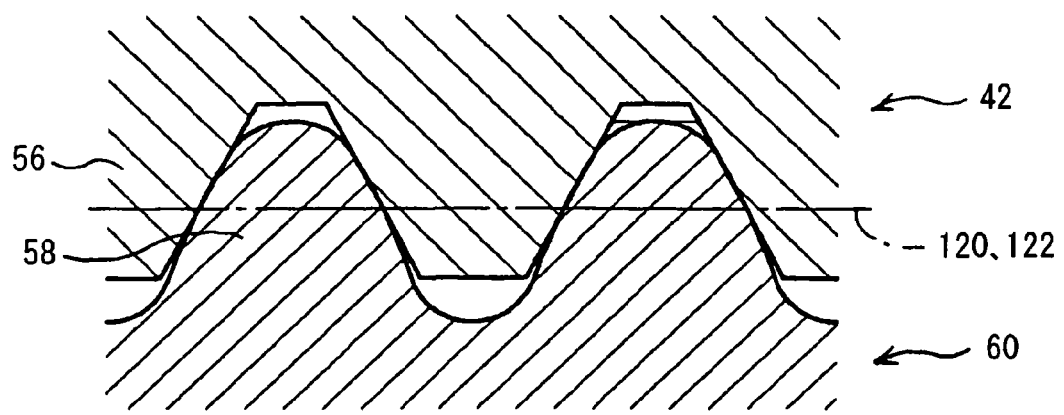
FIG. 12 is sectional views of the meshing state of the female screw of the outer rotary member and the male screw of the planetary screw roller (A) and the meshing state of the male screw of the planetary screw roller and the male screw of the tie rod connecting bar, in the case that the thread differential Ns of the tie rod connecting bar is +1.
Figure 12B:
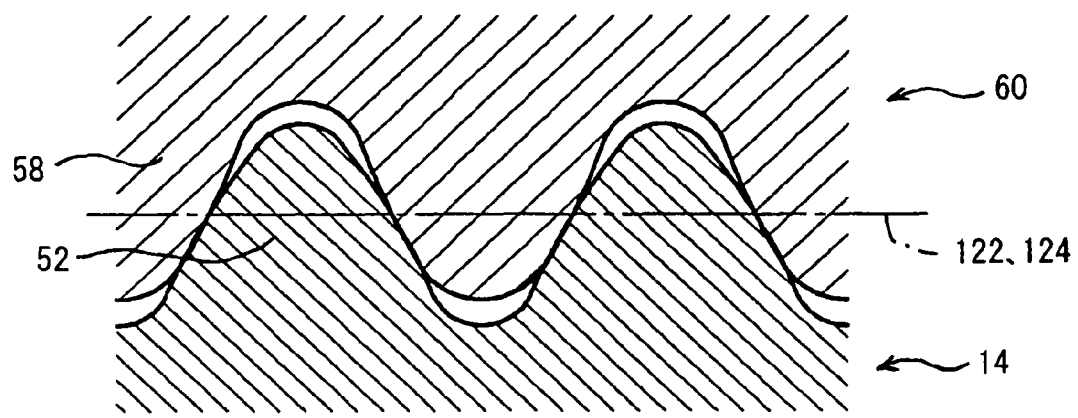

FIG. 12 show the meshing state of the female screw 56 of the outer rotary member 42 and the male screw 58 of the planetary screw roller 60 in (A), and the meshing state of the male screw 58 of the planetary screw roller 60 and the male screw 52 of the tie rod connecting bar 14 about the shown embodiment 2 in which the thread differential Ns of the tie rod connecting bar 14 is +1. As is understood from FIG. 12, as viewed in the section including the axis 12, the planetary screw roller 60 is meshed in good condition with the tie rod connecting bar 14 and the outer rotary member 42A.

Figure 13:
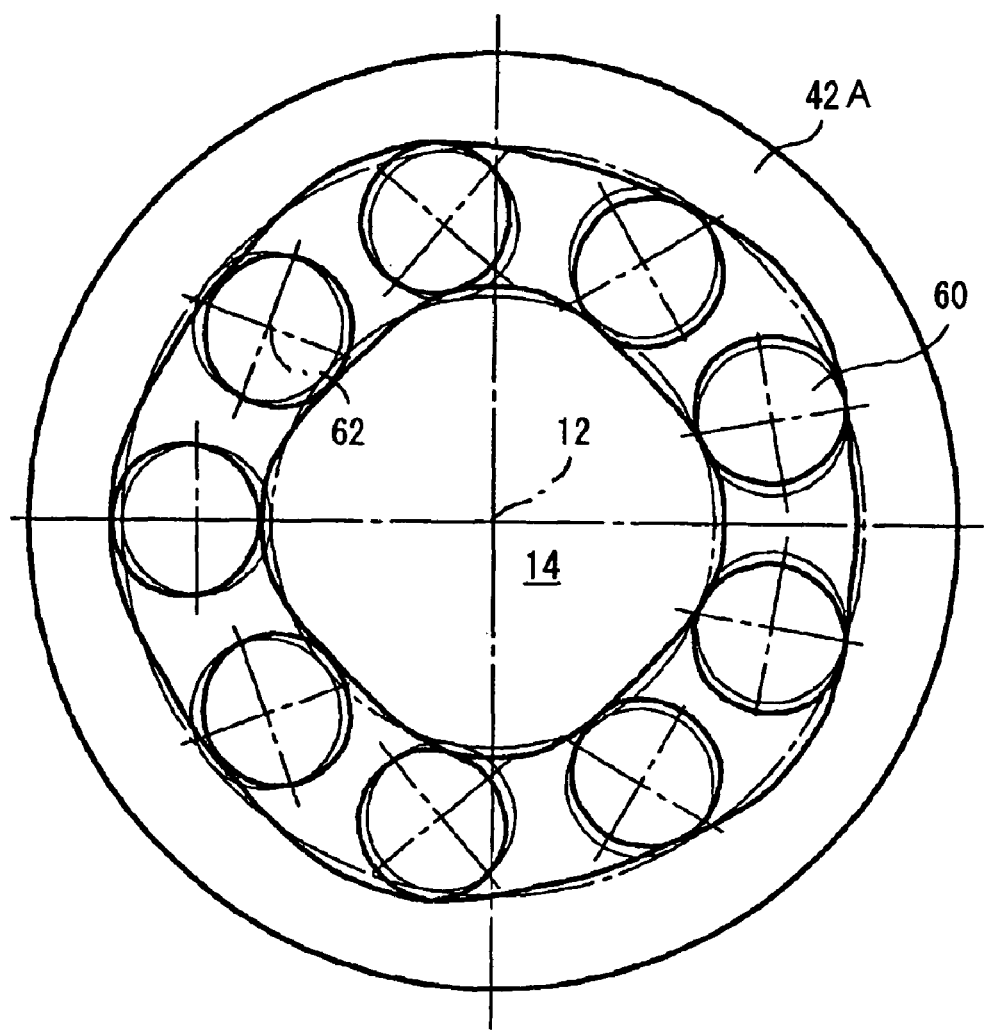
FIG. 13 is an enlarged sectional view showing a section perpendicular to the axis of the central portion of the rotation/linear motion conversion device of the embodiment 2.

FIG. 13 is an enlarged sectional view according to a section perpendicular to the axis 12 at a longitudinally central portion of the rotation/linear motion conversion device 50 in the embodiment 2. In FIG. 13, the thin lines show the pitch diameters (pitch diameters of the gears) of the respective screws and the thick lines show the thread shapes in the section. Moreover, in FIG. 13, the hatching of the respective members are omitted for the purpose of clarity. As will be understood from FIG. 13, also in the section perpendicular to the axis 12, the planetary screw roller 60 maintains a good meshing condition as the gears with the tie rod connecting bar 14 and the outer rotary member 42A, and therefore, the planetary screw roller 60, the tie rod connecting bar 14 and the outer rotary member 42A transmit rotational force thereamong as the meshing gears.

Figure 14A:
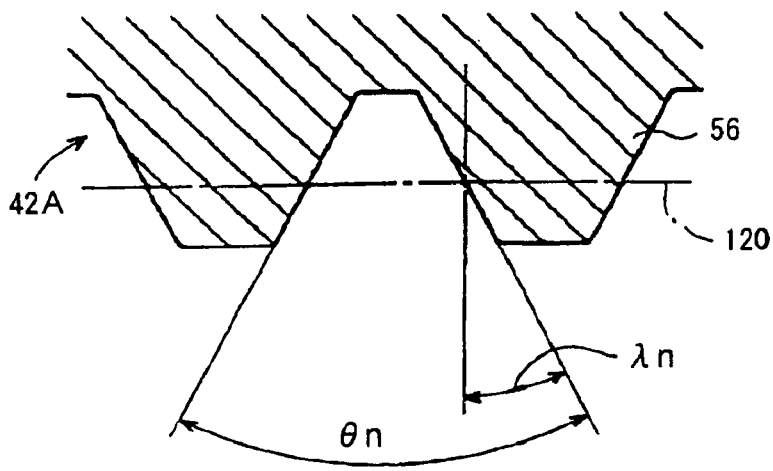
FIG. 14 is enlarged partial sectional views of the respective screws along the axis thereof, wherein (A) show the female screw of the outer rotary member, (B) shows the male screw of the planetary screw roller and (C) shows the male screw of the tie rod connecting bar, in the case that the thread differential Ns of the tie rod connecting bar is −1.
Figure 14B:
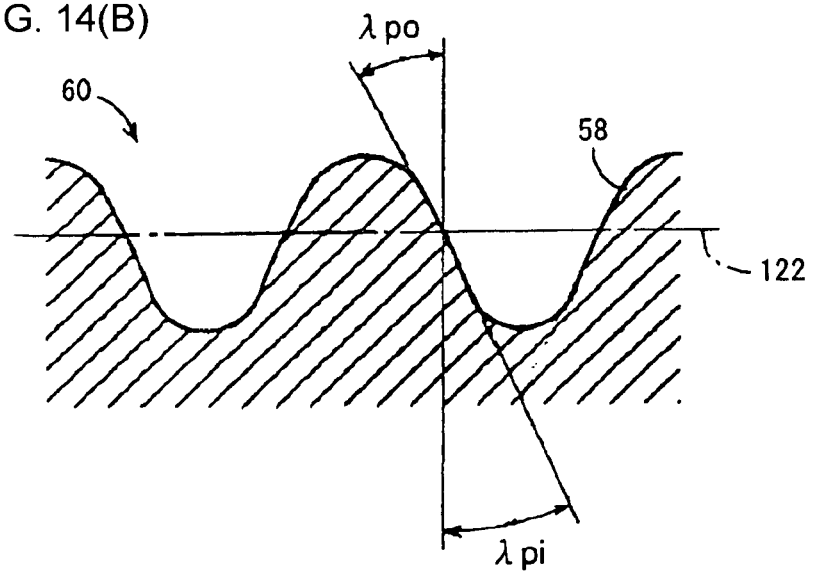
Figure 14C:
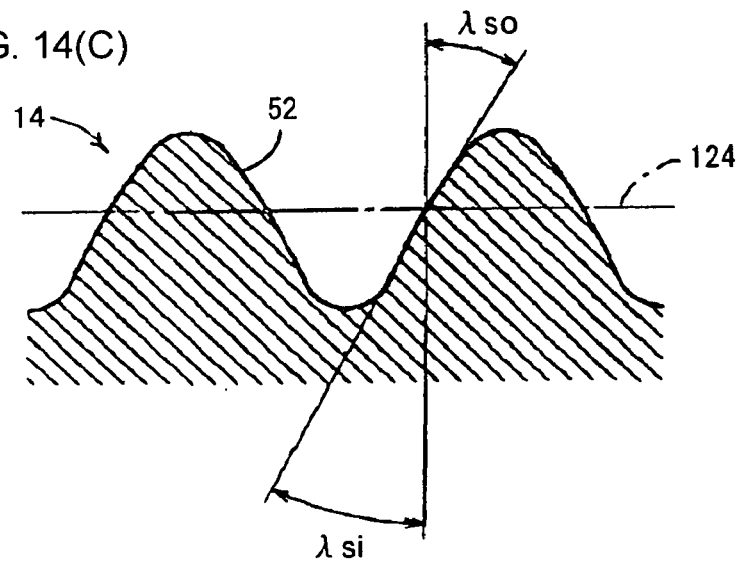

When the thread differential Ns of the tie rod connecting bar 14 is −1, i.e. the number of thread of the tie rod connecting bar 14 is smaller by 1 than the number of thread which satisfies the relationship between the pitch diameter and the number of thread with regard to the tie rod connecting bar 14, the planetary screw roller 60 and the outer rotary member 42A according to which no axial displacement occurs among the tie rod connecting bar 14, the planetary screw roller 60 and the outer rotary member 42A when either of the outer rotary member 42A or the tie rod connecting bar 14 is rotated, as shown in FIG. 14, the thread angle $\lambda n$ of the female screw 56 of the outer rotary member 42A, the deddendum angle $\lambda pi$ of the male screw 58 of the planetary screw roller 60 and the addendum angle $\lambda so$ of the male screw 52 of the tie rod connecting bar 14 are made the same with one another. The deddendum angle $\lambda si$ of the male screw 52 of the tie rod connecting bar 14 is made to such a value that the thread angle of the deddendum of the tie rod connecting bar 14 is set to the smaller one of the two thread angles calculated based upon the means pressure angle and the helix angle.

Figure 15A:
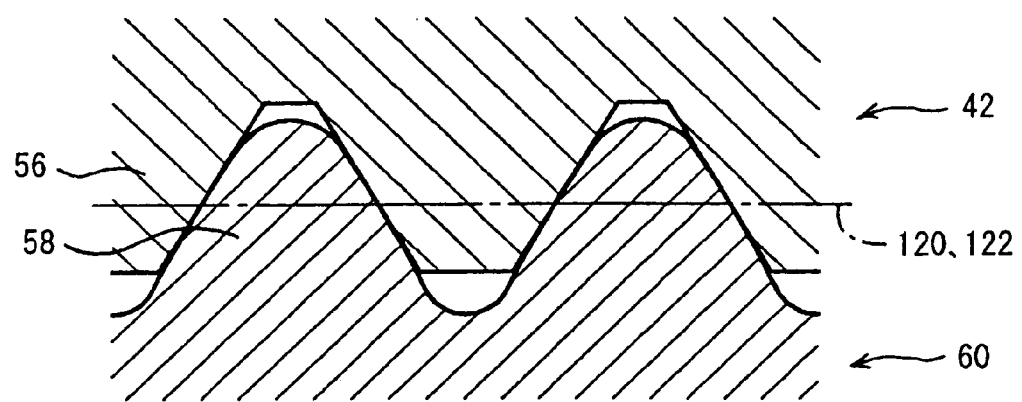
FIG. 15 is sectional views showing the meshing state of the female screw of the outer rotary member and the male screw of the planetary screw roller (A) and the meshing state of the male screw of the planetary screw roller and the male screw of the tie rod connecting bar, in the case that the thread differential Ns of the tie rod connecting bar is −1.
Figure 15B:
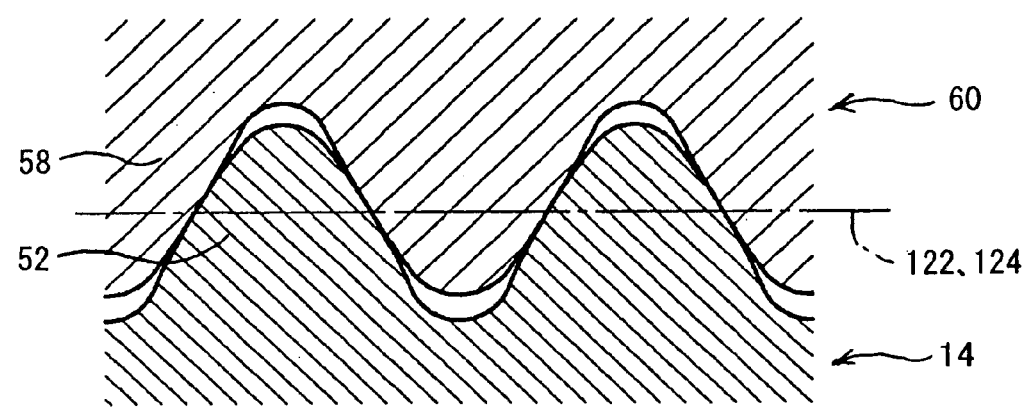

FIG. 15 shows the meshing state between the female screw 56 of the outer rotary member 42 and the male screw 58 of the planetary screw roller 60 in (A), and the meshing state between the male screw 58 of the planetary screw roller 60 and the male screw 52 of the tie rod connecting bar 14 in (B) when the thread shapes are set as described above in the case that the thread differential Ns of the tie rod connecting bar 14 is −1. As will be understood from FIG. 15, also in the case that the thread differential Ns is −1, as viewed in the section including the axis 12, the planetary screw roller 60 meshes with the tie rod connecting bar 14 and the outer rotary member 42 in good condition. Moreover, although not shown in the figure, in the same manner as the case of FIG. 13, also as viewed in the section perpendicular to the axis 12, the planetary screw roller 60 maintains the meshing condition with the tie rod connecting bar 14 and the outer rotary member 42 as the gears, and therefore, the planetary screw roller 60, the tie rod connecting bar 14 and the outer rotary member 42 transmit rotational force therebetween as the gear meshing.

Thus, according to the shown embodiment 2, as is the case of the abovementioned embodiment 1, the tie rod connecting bar 14, the planetary screw roller 60 and the outer rotary member 42A cooperate to function as a speed reduction means like the planetary gear reduction mechanism, while the planetary screw roller 60 and the outer rotary member 42 cooperate to function as a differential screw means, while the tie rod connecting bar 14 is supported not to rotate but to be shiftable in the axial directions. Therefore, an accurate conversion of the rotational motion of the outer rotary member 42A to the corresponding linear motion of the tie rod connecting bar 14 is obtained by maintaining a precise correspondence therebetween.

Particularly according to the shown embodiment 2, when the outer rotary member 42A rotates, the planetary screw roller 60 does not shift in the axial direction, and the tie rod connecting bar 14 only shifts in the axial direction, and therefore, as compared with the construction in which the planetary screw roller 60 shifts in the axial direction as in the case of the abovementioned embodiment 1, the total mass of the members to make the axial displacement can be decreased, with a reduction of the length of the outer rotary member 42, making it possible to decrease the length of the power steering device.

Although the rotation/linear motion conversion device 50 of the abovementioned embodiment 1 will operate satisfactorily, if some foreign material such as dust attaches to the tie rod connecting bar 14, the tie rod connecting bar 14 and the planetary screw roller 60 will stick together, so that thereby a slip is generated between the outer rotary member 42A and the planetary screw roller 60, causing an axial displacement of only of the outer rotary member 42A relative to the tie rod connecting bar 14 and the planetary screw roller 60. Such a phenomenon will become prominent when a lubricant is supplied between the outer rotary member 42A and the planetary screw roller 60. Moreover, a helix screw displacement can happen between the planetary screw roller 60 and the tie rod connecting bar 14 by the tie rod connecting bar 14 sliding relative to the planetary screw roller 60 without depending upon the abovementioned differential principle.

In this regard, in the rotation/linear motion conversion device 50 of the embodiment 2, each of the planetary screw rollers 60 has the outer gears 90 and 92 meshing with the inner gears 94 and 96 fixed at the opposite ends of the female screw 56 of the outer rotary member 42, so that the rotation of the outer rotary member 42 or the planetary screw roller 60 is transmitted from one to the other by the meshing between the outer gears 90, 92 and the inner gears 94, 96, whereby it is definitely prevented that the outer rotary member 42A only shifts axially relative to the tie rod connecting bar 14 and the planetary screw roller 60 due to a sliding generated between the outer rotary member 42A and the planetary screw roller 60.

Moreover, when the outer rotary member 42A rotates around the axis 12, the planetary screw rollers 60 are positively rotated around their own axes, so that thereby the planetary screw rollers 60 revolve positively around the tie rod connecting bar 14, whereby the tie rod connecting bar 14 is definitely shifted in the axial direction based upon the differential principle, while preventing the tie rod connecting bar 14 to slip.

Particularly according to the rotation/linear motion conversion device 50 of the embodiment 2, the outer gears 90 and 92 are aligned with the axis of the planetary screw roller 60, and the basic pitch diameter of the outer gears 90 and 92 is the same as the basic pitch diameter of the male screw 58 of the planetary screw roller 60. The ratio of the number of teeth between the outer gears 90, 92 and the inner gears 94, 96 is equal to the ratio between the pitch diameters of the male screw 58 of the planetary screw roller 60 and the female screw 56 of the outer rotary member 42, and therefore is equal to the ratio between the thread numbers of the male screw 58 and the female screw 56.

Therefore, the relationship in the rotational speed between the outer rotary member 42 and the planetary screw roller 60 is precisely specified by the ratio of the number of teeth between the outer gears 90, 92 and the inner gears 94, 96, and is precisely coincided with the relationship in the ratio between the pitch diameters of the male screw 58 and the female screw 56. Therefore, even when a change has occurred in the ratio of the actual pitch diameters due to a manufacturing allowance of the male screw 58 and the female screw 56 or according to the lapse of time, the relationship in the rotational speed between the outer rotary member 42 and the planetary screw roller 60 to ensure the operation based upon the differential principle is definitely maintained, whereby a more definite and precise operation of the rotation/linear motion conversion device 50 is ensured for a long period than the aforementioned embodiment 1.

In the rotation/linear motion conversion device 50 of the shown embodiment 2, the male screw 52 of the tie rod connecting bar 14 and the male screw 58 of the planetary screw roller 60 are opposite to one another, and these screws themselves construct the meshing gears of the spur type. Therefore, for the transmission of rotation or the basic operation, the outer gears 90, 92 and the inner gears 94, 96 are not necessary. Therefore, in the rotation/linear motion conversion device 50 of the embodiment 2, the outer gears 90, 92 and the inner gears 94, 96 are added auxiliary to definitely exclude such operations as the abovementioned slippage not based upon the differential principal, as a most convenient means to ensure the operation based upon the intended differential principle.

Moreover, in the construction of the rotation/linear motion conversion device 50 of the shown embodiment 2, the outer gears 90, 92 and the inner gears 94, 96 also specify the operation of the tie rod connecting bar 14 as described above. In other words, in the construction of the rotation/linear motion conversion device 50 of the shown embodiment 2, they exclude the slippage between the tie rod connecting bar 14 and the planetary screw roller 60.

Even when all of the planetary screw rollers 60 are formed in the same shape, it can happen that the relationship in the phase of the outer gear 90 relative to the male screw 58 at one end of the planetary screw roller 60 is different from the relationship in the phase of the outer gear 92 relative to the male screw 58 at the other end of the planetary screw roller 60. Therefore, all of the planetary screw rollers 60 must be assembled into the outer rotary member 42A so that the direction of the planetary screw roller 60 relative to the outer rotary member 42A is the same with respect to all of them.

In this regard, according to the rotation/linear motion conversion device 50 of the embodiment 2, the diameter of the shaft portion 60A at one end of the planetary screw roller 60 is designed to be smaller than the diameter of the shaft portion 60B at the other end of the planetary screw roller 60, and corresponding thereto the diameter of the hole 106 of the support ring 100 of the carrier 98 is designed to be smaller than the diameter of the hole 108 of the support ring 102. Therefore, the direction of the planetary screw roller 60 is easily and definitely made the same with respect to all of them, whereby all of the planetary screw rollers 60 are properly assembled into the outer rotary member 42A, and the outer gears 90 and 92 are properly meshed with the inner gears 94 and 96.

In order to accomplish a smooth transmission of rotation by the meshing between the outer gears 90 and 92 of the planetary screw roller 60 and the inner gears 94 and 96, it is desirable that the numbers of teeth of these outer and inner gears are large, but when the numbers of teeth are increased, the diameter of the planetary screw roller 60 can not be decreased, and the size of the teeth becomes smaller, making it difficult or impossible to work the gears by the press rolling or the like.

According to the rotation/linear motion conversion device 50 of the embodiment 2, the tooth shapes of the outer gears 90 and 92 of the planetary screw roller 60 are displaced in the phase relative to one another by an angle larger than 0° and smaller than 360°, and the inner gears 94 and 96 are also displaced in the phase relative to one another. Therefore, the same effect as to increase the number of teeth twice as much is obtained without decreasing the size of the teeth, whereby it is avoided that the size of the rotation/linear motion conversion device 50 increases due to an increase of the diameter of the planetary screw roller 60, and the male screw 58 and the outer gears 90, 92 of the planetary screw roller of 60 can be formed by the less costly press rolling, not by the cutting, just like the working of the male screw 52 of the tie rod connecting bar 14 and the female screw 56 of the outer rotary member 42A.

Moreover, according to the rotation/linear motion conversion device 50 of the embodiment 2, the outer gears 90 and 92 are formed by forming the spur gears at the opposite end portions of the male screw 58, so that the thread of the male screw 58 extends along the axis 62 with the thread of the male screw 58 being separated by the tooth grooves for the spur gears equally spaced around the axis 62. Therefore, as compared with such a case that the outer gears 90 and 92 are formed as the members separate from the body of the planetary screw roller 60 and fixed thereto, the planetary screw roller 60 can be manufactured easily at high efficiency and low cost. Moreover, in assembling the planetary screw roller 60 in the outer rotary member 42A, the outer gears 90 and 92 can function as a portion of the male screw 58.

Figure 16:
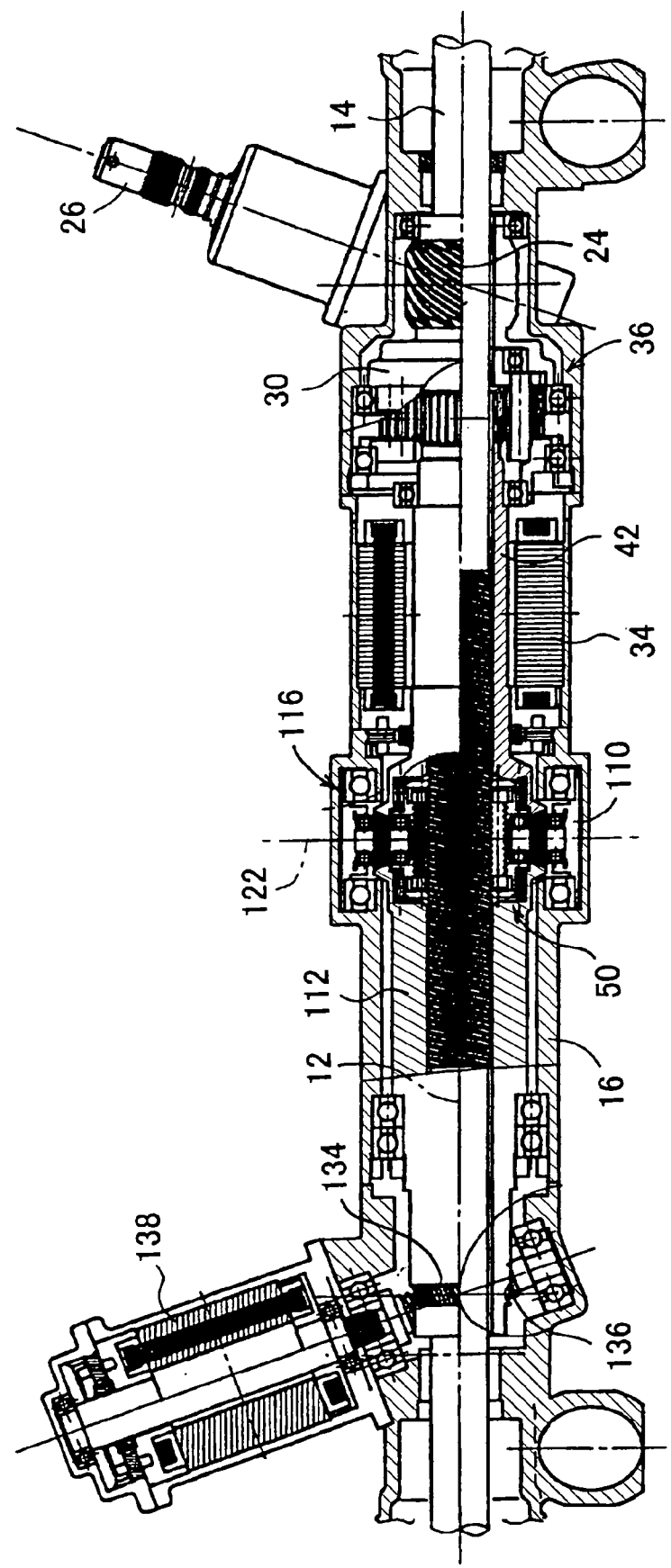
FIG. 16 is a sectional view showing the essential portions of the embodiment 3 of the electric power steering device for vehicles according to the present invention.
Figure 17:
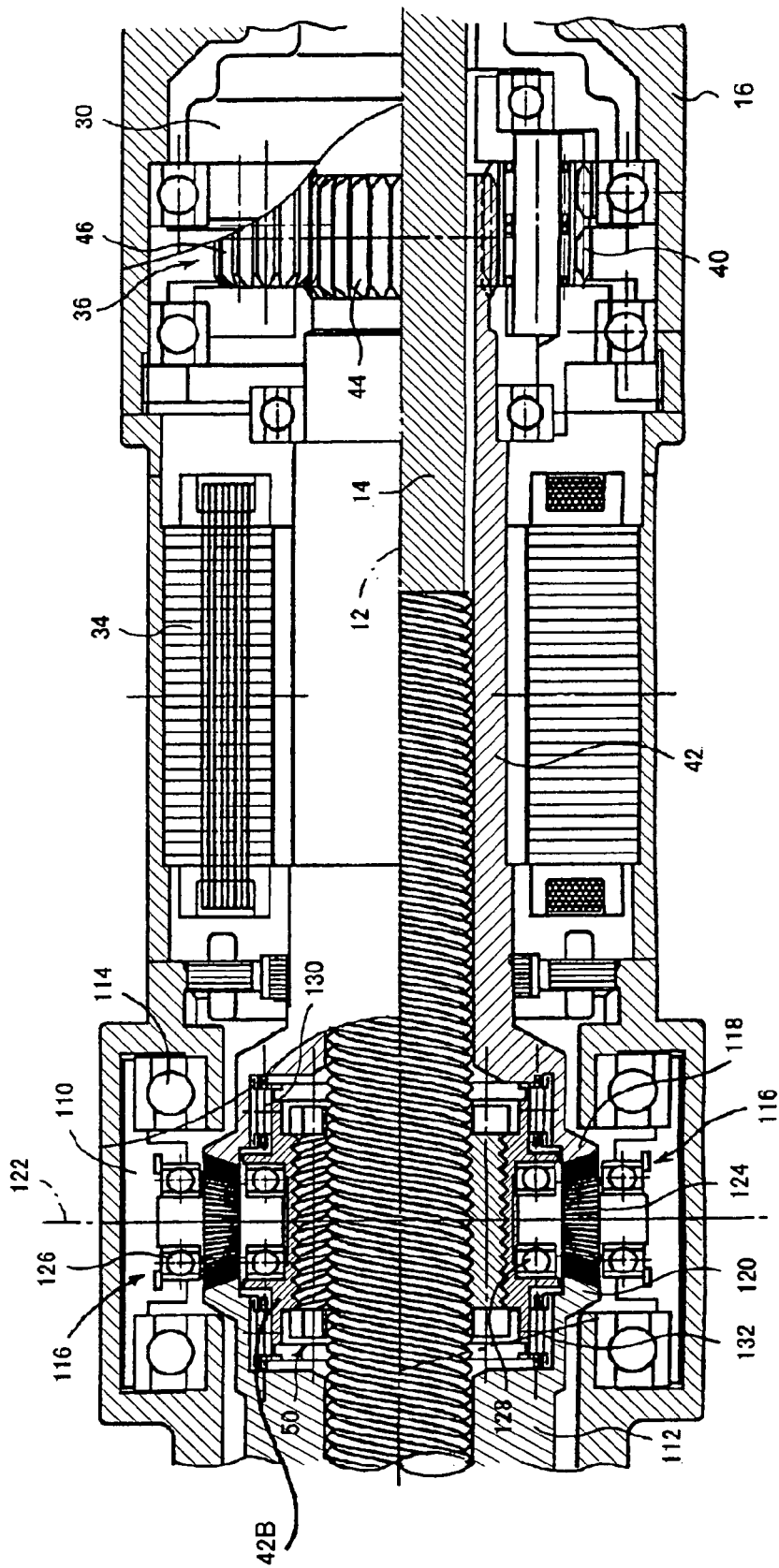
FIG. 17 is an enlarged sectional view showing the planetary differential screw type rotation/linear motion conversion device shown in FIG. 16.
Figure 18:
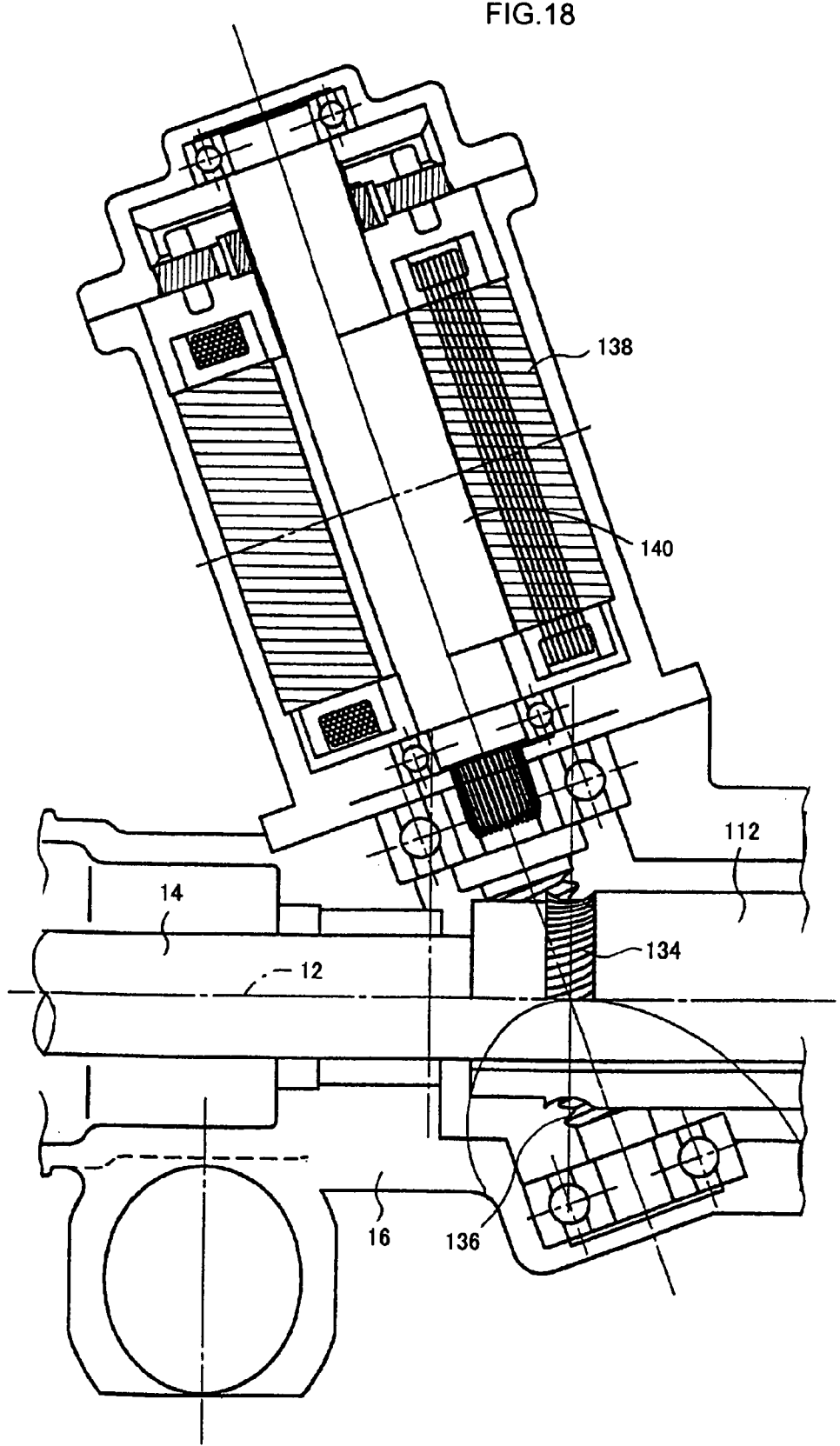
FIG. 18 is an enlarged sectional view showing the active steering electric motor shown in FIG. 16.

FIG. 16 is a sectional view showing the essential portions of the embodiment 3 of the electric power steering device for vehicles according to the present invention, and FIG. 17 is an enlarged sectional view showing the planetary differential screw type rotation/linear motion conversion device shown in FIG. 16. FIG. 18 is an enlarged sectional view of the electric motor for the active steering control shown in FIG. 16. In FIGS. 16-18, the portions corresponding to those shown in FIGS. 1-4 are designated by the same reference numerals.

In this embodiment 3, in addition to the rotary sleeves 30 and 42, an intermediate rotary sleeve 42B, a rotary support sleeve 110 and an active steering rotary sleeve 112 are provided. The intermediate rotary sleeve 42B is positioned between the other end of the rotary sleeve 42 and one end of the active steering rotary sleeve 112, and the rotary support sleeve 110 is positioned at the radially outside of the intermediate rotary sleeve 42B. The rotary support sleeve 110 is supported by the housing 16 by way of a bearing 114 to be rotatable around the axis 12.

A differential gear device 116 is provided as a complex rotation transmission mechanism to transmit rotations among the other end of the rotary sleeve 42, the one end of the active steering rotary sleeve:112 and the intermediate rotary sleeve 42B. As shown in detail in FIG. 17, the differential gear device 116 includes a bevel gear 118 provided at the other end of the rotary sleeve 42 as aligned with the axis 12 to extend around the tie rod connecting bar 14, a bevel gear 120 provided at the one end of the active steering rotary sleeve 112 as aligned with the axis 12 to extend around the tie rod connecting bar 14 and opposed to the bevel gear 118, and a plurality of bevel gears 124 supported to be rotatable around an axis 122 perpendicular to the axis 12 and to mesh with the bevel gears 118 and 120.

The radially outside shaft portions of the respective bevel gears 124 are supported by the rotary support sleeve 110 by way of bearings 126 to be rotatable around the axis 122, and the radially inside shaft portions of the bevel gears 124 are supported by the intermediate rotary sleeve 42B by way of bearing 128 to be rotatable around the axis 122. Therefore, the intermediate rotary sleeve 42B rotates around the axis 12 together with the rotary support sleeve 110. A bearing 130 is provided between the intermediate rotary sleeve 42B and the other end of the rotary sleeve 42, while a bearing 132 is provided between the intermediate rotary sleeve 42B and the one end of the active steering rotary sleeve 112, whereby the intermediate rotary sleeve 42B is supported by the other end of the rotary sleeve 42 and the one end of the active steering rotary sleeve 112 by way of the bearings 130 and 132 to be a rotatable around the axis 12.

Between the rotary sleeve 42 and the active steering rotary sleeve 112 and radially inside of the differential gear device 116, there is provided the planetary differential screw type rotation/linear motion conversion device 50, which is of the type that both of the intermediate rotary sleeve 42B and the planetary screw roller 60 make no axial displacement when the intermediate rotary sleeve 42B is rotated.

As shown in detail in FIG. 18, a worm gear 134 is provided at the other end of the active steering rotary sleeve 112, and a worm 136 is meshed to the worm gear 134. The worm 136 is connected with a rotary shaft 140 of an electric motor 138 for the active steering, so that the worm gear 134 and the worm 136 construct a rotation transmission mechanism for transmitting the rotation of the electric motor 138 to the active steering rotary sleeve 112 as a rotation around the axis 12.

Therefore, this embodiment 3 has the power assist function as the embodiments 1 and 2 have, and the active steering function as the embodiment 1 has.

Thus, according to the shown embodiment 3, the rotary power of the electric motor 34 for the power assist drives the rotary sleeve 42 to be transmitted to the intermediate rotary sleeve 42 of the planetary differential screw type rotation/linear motion conversion device 50, while the rotation of the active steering electric motor 138 is transmitted to the intermediate rotary sleeve 42B of the rotation/linear motion conversion device 50 by way of the rotation transmission mechanism made of the worm 136 and worm gear 134 and the differential gear device 116. Since the rotary force of the power assist electric motor 34 is transmitted to the rotary sleeve 42 at the outlet of the planetary gear device 36 functioning as a multiplying device, a more strong power assist is available than the case of the embodiment 1.

On the other hand, since the active steering electric motor 138 rotates the active steering rotary sleeve 112 by way of the worm 136 and the worm gear 134, it may be of a light weight. The active steering electric motor in this embodiment may also be replaced by an electric motor co-axial with the tie rod connecting bar 14 in the same manner as in the abovementioned embodiment 1.

Although the present invention has been described in detail with respect to several embodiments thereof, it will be apparent for those skilled in the act that various other embodiments are possible within the scope of the present invention.

For example, although in the abovementioned embodiments the multiplying device 33 by the planetary gear device is provided to transmit the rotation of the worm shaft 26 as multiplied to the worm gear 28, the multiplying device 33 may be of any type other than the planetary gear type, or may be omitted.

Further, although in the abovementioned embodiments the left and right tie rods 20L and 20R are pivotably connected at the opposite ends of the tie rod connecting bar 14, so that the left and right steered wheels are steered for the same steering angle at the same time, there may be provided a left side tie rod connecting bar pivotably connected at one end to the left side tie rod and a right side tie rod connecting bar pivotably connected at one end to the right side tie rod as the tie rod connecting bar, and a left side transmission mechanism and a right side transmission mechanism as the transmission mechanism, so that the steering amounts of the left and right steered wheels by the active steering are independently controlled.

Further, although in the abovementioned embodiments the rotation/linear motion conversion device is a planetary differential screw type rotation/linear motion conversion device, in any of these embodiments the rotation/linear motion conversion device may be of any known type of rotation/linear motion combustion device such as, for example, ball/screw mechanism.

Further, although in the above mentioned embodiment 1, the planetary gear device 36 is provided among the rotary sleeve 30, the inner rotary sleeve 42 and the outer rotary sleeve 38 as the transmission mechanism, the transmission mechanism may be replaced by a differential gear device which is the same as that in the abovementioned embodiment 3.

Further, although in the abovementioned embodiment 1, the outer rotary sleeve 38 is directly rotated by the active steering electric motor 48 co-axial with the tie rod connecting bar 14, it may be rotated by the active steering electric motor 48 by way of the rotation transmission device made of worm and worm gear in the same manner as in the abovementioned embodiment 3.

Further, although in abovementioned embodiments, the thread differential of the rotation/linear motion conversion device 50 is +1 or −1, the thread differential may be designed to any optional number.

Further, although in the abovementioned embodiment 1, the packing members 80 and 82 have male screws 84 and 86 engaging with the female screw 56 of the inner rotary sleeve 42, these screws may be omitted. Further, these packing members may be replaced by cylindrical dust booths made of an elastic material such as rubber supported at one end by an axially shiftable member and connected at the other end to be able to rotate relative to the rotary member.

Further, although in the above mentioned embodiment 1, the carriers 64 and 66 are in the shape of an annular block, the carriers 64 and 66 may each be constructed as an annular plate member perpendicular to the axis 12. In that case, it is desirable that the plate member is made of a vibration suppressing steel plate so that the rotational vibration of the planetary screw rollers 60 is effectively dampened.

Further, in the abovementioned embodiment 2, the outer gears 90, 92 and the inner gears 94, 96 may be provided only at one end side of either of the planetary screw rollers 60, or may be replaced by a rotation transmission means other than gears. Further, in the embodiment 2, since the tooth shapes of the screws of the outer rotary member 42, the planetary screw roller 60 and the tie rod connecting bar 14 are designed as the tooth shapes to properly transmit rotations therebetween, the outer gears 90, 92 and the inner gears 94, 96 may be omitted.

Further, the thread angles and the tooth shapes in the embodiment 2 may be applied to the embodiment 1, and the constructions of the outer gears 90, 92 and the inner gears 94, 96 or the carrier 98 may be applied to the embodiment 1.

The invention claimed is:

1. An electric power steering device for vehicles comprising a tie rod connecting bar supported to make a linear motion, a rotary member rotatable around the tie rod connecting bar, a rotation conversion device for converting a rotation of a steering shaft to a rotation of the rotary member, a rotation/linear motion conversion device for converting a rotation of the rotary member to a linear motion of the tie rod connecting bar, and a power assist electric motor to give a rotational force to the rotary member, wherein the rotation/linear motion conversion device is a planetary gear device including a ring gear, a sun gear, a planetary pinion and a carrier supporting the planetary pinion, and in the correspondence between pitch diameters and thread numbers of the ring gear, the sun gear and the planetary pinion the thread number of either the ring gear or the sun gear is increased or decreased so that thereby an axial displacement is generated between the ring gear and the sun gear when the ring gear rotates around the sun gear with a planetary motion of the planetary pinion.

2. The electric power steering device for vehicles according to claim 1, wherein the relative increase or decrease of the thread number is made with respect to the ring gear, the ring gear is longer than the sun gear and the planetary pinion, and the sun gear and the planetary pinion shift in the axial direction relative to the ring gear according to a rotation of the ring gear.

3. The electric power steering device for vehicles according to claim 2, wherein a set of meshing outer gears are provided at opposing end portions of the sun gear and the planetary pinion.

4. The electric power steering device for vehicles according to claim 3, wherein the outer gear provided at the end portion of the planetary pinion is formed integral with a portion of the screw thread of the planetary pinion.

5. The electric power steering device for vehicles according to claim 1, wherein the relative increase or decrease is made with respect to the sun gear, the sun gear is longer than the ring gear and the planetary pinion, and the ring gear and the planetary pinion shift in the axial direction relative to the sun gear according to a rotation of the ring gear.

6. The electric power steering device for vehicles according to claim 5, wherein the thread number of the sun gear is increased by 1 relative to those of the ring gear and the planetary pinion, and as viewed in a section including a central axis of the ring gear, the sun gear and the planetary pinion, the screw threads of the ring gear, the sun gear and the planetary pinion are of a symmetrical chevron, the thread angle of the ring gear is equal to the thread angle of addendum of the planetary pinion and the thread angle of deddendum of the sun gear, the planetary pinion is of an involute shape of the thread angle of deddendum thereof being smaller than the thread angle of addendum thereof, and the sun gear is of an involute shape of the thread angle of addendum thereof being larger than the thread angle of deddendum thereof.

7. The electric power steering device for vehicles according to claim 5, wherein the thread number of the sun gear is decreased by 1 relative to those of the ring gear and the planetary pinion, and as viewed in a section including a central axis of the ring gear, the sun gear and the planetary pinion, the screw threads of the ring gear, the sun gear and the planetary pinion are of a symmetrical chevron, the thread angle of the ring gear is equal to the thread angle of addendum and deddendum of the planetary pinion and the thread angle of addendum of the sun gear, and the sun gear is of an involute shape of the thread angle of deddendum thereof being smaller than the thread angle of addendum thereof.

8. The electric power steering device for vehicles according to claim 5, wherein a set of meshing outer gears are provided at opposing end portions of the ring gear and the planetary pinion.

9. An electric power steering device for vehicles comprising a tie rod connecting bar supported to make a linear motion, a rotary member rotatable around the tie rod connecting bar, a rotation conversion device for converting a rotation of a steering shaft to a rotation of the rotary member, a rotation/linear motion conversion device for converting a rotation of the rotary member to a linear motion of the tie rod connecting bar, and a power assist electric motor to give a rotational force to the rotary member, wherein the rotary member incorporates therein a differential mechanism including an input rotary member driven by the rotation conversion device, an output rotary member to drive the rotation/linear motion conversion device, and an intermediate rotary member to variably adjust relative rotation between the input rotary member and the output rotary member, and an active steering is conducted by variably adjusting a rate of conversion of a rotation of the steering shaft to a linear motion of the tie rod connecting bar according to a rotational displacement of the intermediate rotary member.

10. The electric power steering device for vehicles according to claim 9, wherein the differential device is a planetary gear device including a carrier serving as the input rotary member connected with the rotation conversion device, a sun gear serving as the output rotary member connected with the rotation/linear motion conversion device, and a ring gear serving as the intermediate rotary member driven by the electric motor for the active steering including an armature mounted therearound and an electromagnetic coil surrounding the armature to conduct the active steering.

11. The electric power steering device for vehicles according to claim 10, wherein a portion of the intermediate rotary member supporting the armature is a sleeve portion thereof extending around a portion extending from the sun gear to the rotation/linear motion conversion device.

12. The electric power steering device for vehicles according to claim 9, wherein the differential device includes a pair of co-axial bevel gears, a bevel pinion positioned between the pair of bevel gears and meshing therewith, and a carrier supporting the bevel pinion to revolve around the axis of the pair of bevel gears, one of the pair of bevel gears serving as the input rotary member connected with the rotation conversion device, the carrier serving as the output rotary member connected with the rotation/linear motion conversion device, and the other of the pair of bevel gears serving as the intermediate rotary member driven by an electric motor for active steering to conduct the active steering.

13. The electric power steering device for vehicles according to claim 12, wherein the intermediate rotary member is driven by the electric motor for active steering by way of a worm and a worm gear.

14. The electric power steering device for vehicles according to claim 9, wherein the rotation/linear motion conversion device is a planetary gear device including a ring gear, a sun gear, a planetary pinion and a carrier supporting the planetary pinion, and in the correspondence between pitch diameters and thread numbers of the ring gear, the sun gear and the planetary pinion the thread number of either the ring gear or the sun gear is increased or decreased so that thereby an axial displacement is generated between the ring gear and the sun gear when the ring gear rotates around the sun gear with a planetary motion of the planetary pinion.

15. The electric power steering device for vehicles according to claim 9, wherein the relative increase or decrease of the thread number is made with respect to the ring gear, the ring gear is longer than the sun gear and the planetary pinion, and the sun gear and the planetary pinion shift in the axial direction relative to the ring gear according to a rotation of the ring gear.

16. The electric power steering device for vehicles according to claim 9, wherein the relative increase or decrease is made with respect to the sun gear, the sun gear is longer than the ring gear and the planetary pinion, and the ring gear and the planetary pinion shift in the axial direction relative to the sun gear according to a rotation of the ring gear.

17. The electric power steering device for vehicles according to claim 9, wherein the thread number of the sun gear is increased by 1 relative to those of the ring gear and the planetary pinion, and as viewed in a section including a central axis of the ring gear, the sun gear and the planetary pinion, the screw threads of the ring gear, the sun gear and the planetary pinion are of a symmetrical chevron, the thread angle of the ring gear is equal to the thread angle of addendum of the planetary pinion and the thread angle of deddendum of the sun gear, the planetary pinion is of an involute shape of the thread angle of deddendum thereof being smaller than the thread angle of addendum thereof, and the sun gear is of an involute shape of the thread angle of addendum thereof being larger than the thread angle of deddendum thereof.

18. The electric power steering device for vehicles according to claim 9, wherein the thread number of the sun gear is decreased by 1 relative to those of the ring gear and the planetary pinion, and as viewed in a section including a central axis of the ring gear, the sun gear and the planetary pinion, the screw threads of the ring gear, the sun gear and the planetary pinion are of a symmetrical chevron, the thread angle of the ring gear is equal to the thread angle of addendum and deddendum of the planetary pinion and the thread angle of addendum of the sun gear, and the sun gear is of an involute shape of the thread angle of deddendum thereof being smaller than the thread angle of addendum thereof.

19. The electric power steering device for vehicles according to claim 9, wherein a set of meshing outer gears are provided at opposing end portions of the sun gear and the planetary pinion.

20. The electric power steering device for vehicles according to claim 9, wherein a set of meshing outer gears are provided at opposing end portions of the ring gear and the planetary pinion.

21. The electric power steering device for vehicles according to claim 9, wherein the outer gear provided at the end portion of the planetary pinion is formed integral with a portion of the screw thread of the planetary pinion.

22. The electric power steering device for vehicles according to claim 9, wherein the rotary member includes a sleeve portion for passing the tie rod connecting bar therethrough, and the power assist electric motor is so constructed that an armature provided along the sleeve portion is driven by an electromagnetic coil provided therearound in a cylindrical shape.

* * * * *